US011438878B1

(12) United States Patent
Xue et al.

(10) Patent No.: US 11,438,878 B1
(45) Date of Patent: Sep. 6, 2022

(54) SUB-RESOURCE POOL FOR TRANSMISSION OF NEW RADIO SIDELINK OVER UNLICENSED BANDS

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/211,291

(22) Filed: Mar. 24, 2021

(51) Int. Cl.
| | | |
|---|---|---|
| *H04W 72/02* | (2009.01) | |
| *H04W 72/04* | (2009.01) | |
| *H04W 80/02* | (2009.01) | |
| *H04W 28/02* | (2009.01) | |
| *H04W 74/08* | (2009.01) | |

(52) U.S. Cl.
CPC ....... *H04W 72/02* (2013.01); *H04W 28/0289* (2013.01); *H04W 72/0493* (2013.01); *H04W 74/0833* (2013.01); *H04W 80/02* (2013.01)

(58) Field of Classification Search
CPC ............. H04W 72/02; H04W 28/0289; H04W 72/0493; H04W 74/0833; H04W 80/00
See application file for complete search history.

(56) References Cited

U.S. PATENT DOCUMENTS

| | | | | |
|---|---|---|---|---|
| 9,769,644 | B2 * | 9/2017 | He | H04W 72/02 |
| 10,412,754 | B2 * | 9/2019 | Khoryaev | H04W 72/1284 |
| 2015/0271841 | A1 * | 9/2015 | Yamada | H04W 72/02 370/329 |
| 2015/0327240 | A1 * | 11/2015 | Yamada | H04W 8/005 455/552.1 |
| 2021/0068079 | A1 * | 3/2021 | Sahin | H04W 72/02 |
| 2021/0195637 | A1 * | 6/2021 | Xue | H04W 16/14 |
| 2021/0219283 | A1 * | 7/2021 | Xue | H04W 28/26 |
| 2021/0250802 | A1 * | 8/2021 | Zheng | H04W 76/10 |
| 2022/0070876 | A1 * | 3/2022 | Bangolae | H04W 72/085 |

* cited by examiner

*Primary Examiner* — Kashif Siddiqui
(74) *Attorney, Agent, or Firm* — Liem T. Do

(57) ABSTRACT

Sub-resource pools for transmission of new radio (NR) sidelink (NR SL) over unlicensed bands is disclosed. A user equipment (UE) capable for sidelink communications may receive a sidelink configuration message from a serving base station that includes identification of a plurality of channel access types associated with a plurality of sub-resource pools for autonomous sidelink access of a shared communication channel. The UE may obtain information for a sidelink transmission over a transmission resource pool allocated for the autonomous sidelink access and determine the plurality of sub-resource pools from available resources within the transmission resource pool according to a channel access type of each resource, wherein each sub-resource pool includes a subset of resources associated with a corresponding channel access type. The UE may then select a sub-resource pool for sidelink transmission and transmit the information on a transmission resource selected from the sub-resource pool.

30 Claims, 14 Drawing Sheets

SUB-RESOURCE POOL FOR TRANSMISSION OF NEW RADIO SIDELINK OVER UNLICENSED BANDS

TECHNICAL FIELD

Aspects of the present disclosure relate generally to wireless communication systems, and more particularly, to communications within new radio (NR) operations. Some features may enable and provide for sub-resource pools for transmission of NR sidelink (NR SL) over unlicensed bands.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes receiving, by the UE, a sidelink configuration message from a serving base station, wherein the sidelink configuration message includes identification of a plurality of channel access types associated with a plurality of sub-resource pools for autonomous sidelink access of a shared communication channel, obtaining, by the UE, information for a sidelink transmission over a transmission resource pool allocated for the autonomous sidelink access, determining, by the UE, the plurality of sub-resource pools from a plurality of available resources within the transmission resource pool according to a channel access type of each resource of the plurality of available resources, wherein each sub-resource pool of the plurality of sub-resource pools includes a subset of resources of the plurality of available resources associated with a corresponding channel access type, selecting, by the UE, a sub-resource pool of the plurality of sub-resource pools for sidelink transmission, and transmitting, by the UE, the information on a transmission resource selected from the sub-resource pool via the sideline transmission in response to successful access of the transmission resource according to the channel access type associated with the sub-resource pool.

In an additional aspect of the disclosure, an apparatus configured for wireless communication includes means for receiving, by the UE, a sidelink configuration message from a serving base station, wherein the sidelink configuration message includes identification of a plurality of channel access types associated with a plurality of sub-resource pools for autonomous sidelink access of a shared communication channel, means for obtaining, by the UE, information for a sidelink transmission over a transmission resource pool allocated for the autonomous sidelink access, means for determining, by the UE, the plurality of sub-resource pools from a plurality of available resources within the transmission resource pool according to a channel access type of each resource of the plurality of available resources, wherein each sub-resource pool of the plurality of sub-resource pools includes a subset of resources of the plurality of available resources associated with a corresponding channel access type, means for selecting, by the UE, a sub-resource pool of the plurality of sub-resource pools for sidelink transmission, and means for transmitting, by the UE, the information on a transmission resource selected from the sub-resource pool via the sideline transmission in response to successful access of the transmission resource according to the channel access type associated with the sub-resource pool.

In an additional aspect of the disclosure, a non-transitory computer-readable medium having program code recorded thereon. The program code further includes code to receive, by the UE, a sidelink configuration message from a serving base station, wherein the sidelink configuration message includes identification of a plurality of channel access types associated with a plurality of sub-resource pools for autonomous sidelink access of a shared communication channel, code to obtain, by the UE, information for a sidelink transmission over a transmission resource pool allocated for the autonomous sidelink access, code to determine, by the UE, the plurality of sub-resource pools from a plurality of available resources within the transmission resource pool according to a channel access type of each resource of the plurality of available resources, wherein each sub-resource pool of the plurality of sub-resource pools includes a subset of resources of the plurality of available resources associated with a corresponding channel access type, code to select, by the UE, a sub-resource pool of the plurality of sub-resource pools for sidelink transmission, and code to transmit, by the UE, the information on a transmission resource selected from the sub-resource pool via the sideline transmission in response to successful access of the transmission resource according to the channel access type associated with the sub-resource pool.

In an additional aspect of the disclosure, an apparatus configured for wireless communication is disclosed. The apparatus includes at least one processor, and a memory coupled to the processor. The processor is configured to receive, by the UE, a sidelink configuration message from a serving base station, wherein the sidelink configuration message includes identification of a plurality of channel access types associated with a plurality of sub-resource pools for autonomous sidelink access of a shared communication channel, to obtain, by the UE, information for a sidelink transmission over a transmission resource pool allocated for the autonomous sidelink access, to determine, by the UE, the plurality of sub-resource pools from a plurality of available resources within the transmission resource pool according to a channel access type of each resource of the plurality of available resources, wherein each sub-resource pool of the plurality of sub-resource pools includes a subset of resources of the plurality of available resources associated with a corresponding channel access type, to select, by the UE, a sub-resource pool of the plurality of sub-resource pools for sidelink transmission, and to transmit, by the UE, the information on a transmission resource selected from the sub-resource pool via the sideline transmission in response to successful access of the transmission resource according to the channel access type associated with the sub-resource pool.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
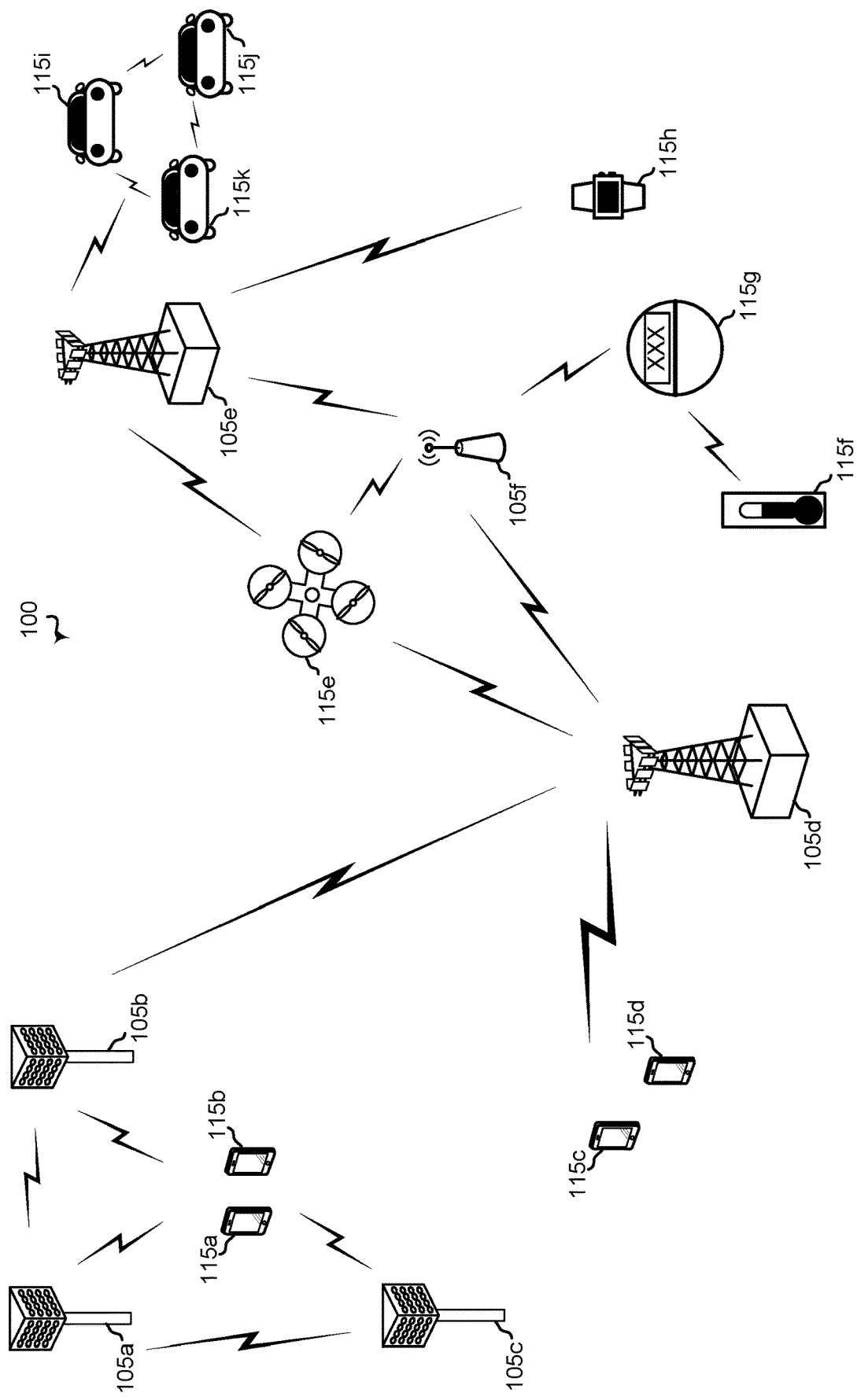
FIG. 1 is a block diagram illustrating details of an example wireless communication system configured to provide sub-resource pools for transmission of NR SL transmissions over unlicensed bands according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support sub-resource pools for transmission of NR SL transmissions over unlicensed bands.

Particular implementations of the subject matter described in this disclosure may be implemented to realize one or more of the following potential advantages or benefits. In some aspects, a UE may receive a sidelink configuration message from a serving base station, wherein the sidelink configuration message includes identification of a plurality of channel access types associated with a plurality of sub-resource pools for autonomous sidelink access of a shared communication channel. The UE may obtain information for a sidelink transmission over a transmission resource pool allocated for the autonomous sidelink access and may determine the plurality of sub-resource pools from a plurality of available resources within the transmission resource pool according to a channel access type of each resource of the plurality of available resources, wherein each sub-resource pool of the plurality of sub-resource pools includes a subset of resources of the plurality of available resources associated with a corresponding channel access type. The UE may then select a sub-resource pool of the plurality of sub-resource pools for sidelink transmission and transmit the information on a transmission resource selected from the sub-resource pool via the sideline transmission in response to successful access of the transmission resource according to the channel access type associated with the sub-resource pool. Such structure information improves the channel access robustness and efficiency by providing more granular structure of available sidelink transmission resources.

Additional aspects that provide for per sub-resource pool characteristics, such as per sub-resource pool congestion control, admission control, resource selection algorithms provides greater flexibility to allow UEs having particular characteristics, such as holding priority data, having low battery power, etc., to be allowed more access to sub-resource pools having more favorable access type or characteristics.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

In some cases, a wireless network may operate in a shared radio frequency spectrum band, which may include licensed or unlicensed (e.g., contention-based) frequency spectrum. For example, such wireless networks may employ license assisted access (LAA), LTE-unlicensed (LTE-U) radio access technology, or NR technology in an unlicensed band (NR-U), such as the 5 GHz ISM band. In the unlicensed frequency portion of the shared radio frequency spectrum band in such networks, network nodes (e.g., UEs and base stations) may perform a medium-sensing procedure to contend for access to the frequency spectrum. For example, a UE or base station may perform a listen-before-talk or listen-before-transmitting (LBT) procedure, such as a clear channel assessment (CCA), prior to communicating in order to determine whether the shared channel is available or occupied.

In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-µs, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-µs slots, may also be referred to as a "Type 1 LBT." An abbreviated LBT procedure, such as a CAT 2 LBT procedure, which may include a one-shot CCA for 16-μs or 25-μs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. Base stations and UEs operating in such unlicensed spectrum may be operated by the same or different network operating entities. In some examples, an individual base station or UE may be operated by more than one network operating entity. In other examples, each base station and UE may be operated by a single network operating entity. As each base station and UE of different network operating entities may contend for the shared resources, increased signaling overhead and communication latency may result.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

For clarity, certain aspects of the apparatus and techniques may be described below with reference to example 5G NR-U implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspect. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
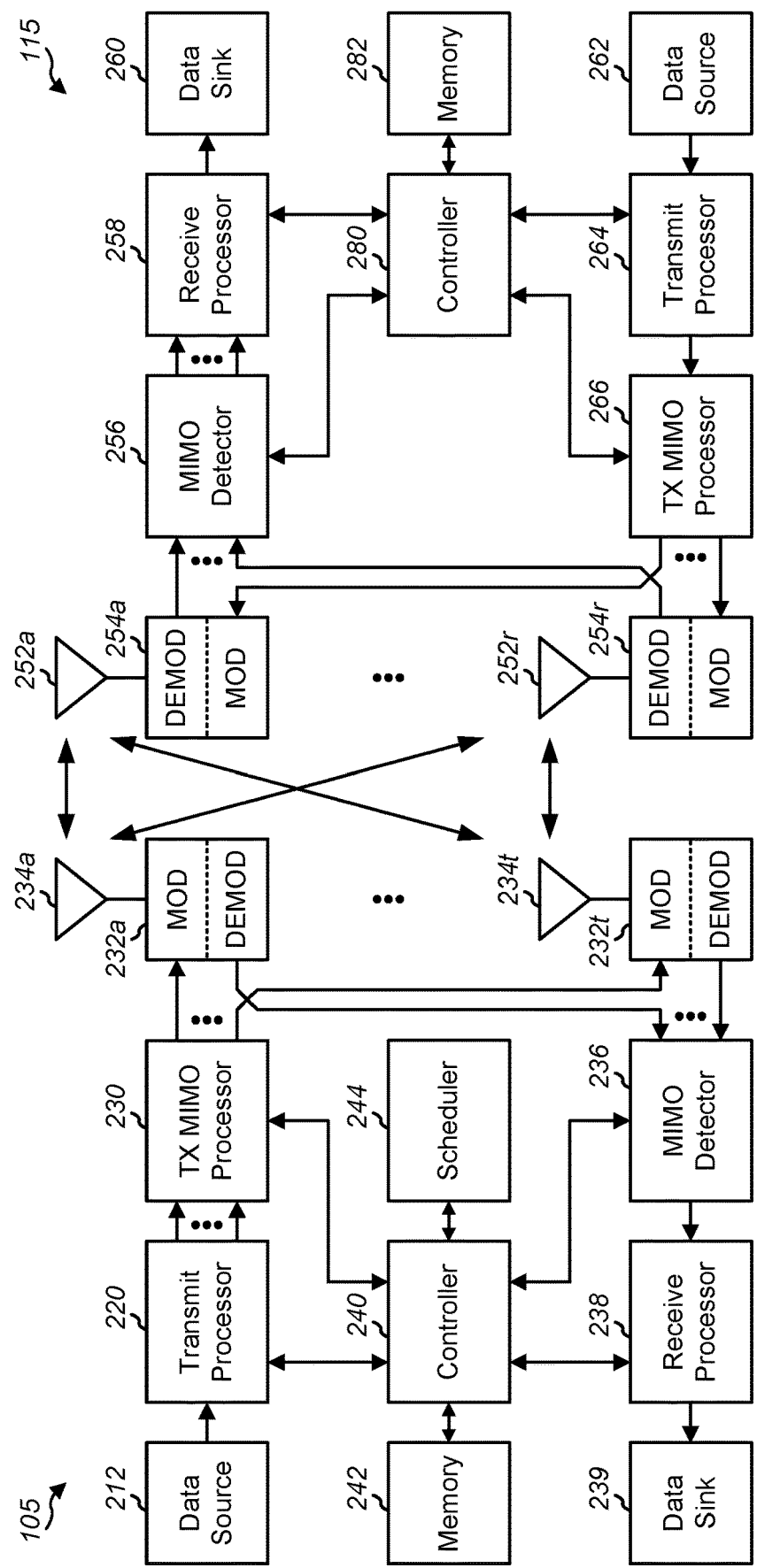
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 4, or other processes for the techniques described herein. Memories 242 and 282 may store data and program codes for base station 105 and UE 115, respectively. Scheduler 244 may schedule UEs for data transmission on the downlink or the uplink.

The 3GPP Release 16 (Rel 16) standards have provided for various use cases of new radio (NR) sidelink (SL) operations, such as for the vehicle-to-everything (V2X) use case. The network may configure sets of resources available for UE sidelink communications. Each such transmission resource pool may be linked to one of the two channel access modes. In a first access mode (Mode 1), for in-coverage deployment, SL UEs may receive grants from serving base stations for channel access to resources within the transmission resource pools. In-coverage generally refers to an SL UE detecting at least one cell on the frequency on which it is configured to perform NR sidelink communications that measures to be suitable for communications. Where no suitable cell is detected on this configured frequency, the SL UE is considered to be out-of-coverage. In a second access mode (Mode 2), for out-of-coverage deployment, SL UEs may use autonomous sensing for channel access.

To support quality of service (QoS) in a Mode 2 based transmission resource pool, Rel 16 describes a channel busy ratio (CBR)/channel usage ratio (CR)-based mechanism that had been developed for dedicated short-range radio communications (DSRC) and the LTE-based cellular-V2X (C-V2X) communications use case. A CBR represents a portion of resources that are sensed as busy over a given sensing interval, while the CR represents a portion of resources used by the UE in a given window. In such a congestion control method, each transmission resource pool may be configured with a mapping from CBR to CR limit, together with other sensing/channel selection parameters upon the basic set-ups like time-frequency resource of the pool, and format of supported channels. A SL UE maintains a measurement of the CBR of the resource pool over a given sensing window. When preparing for sidelink communications, a SL UE considers how access to a particular transmission pool will affect the CR in relation to the CR limit for that transmission pool. If access to the transmission resource pool would place the CR outside of the limit, the SL UE would consider access to a different transmission resource pool or delay the sidelink communications to a later window.

Future application of NR sidelink communications may extend beyond V2X to other communication uses cases. Accordingly, NR sidelink communications are being considered over unlicensed bands as well, because not every vertical domain may obtain licensed spectrum, and vertical domains with licensed spectrum may also seek unlicensed band deployment for a wider, less expensive data bandwidth. When deployed in the 5 GHz unlicensed band, an NR SL UE conducts a listen-before-talk (LBT) procedure which has been tailored for asynchronous channel access.

As a node in a synchronous network, a NR SL UE can only transmit at a synchronized slot boundary. By performing the same type of LBT procedure developed for asynchronous access while occupying the channel at the synchronized slot boundary may place the NR SL UE at a disadvantage when competing with other radio access technologies (RATs), such as Wi-Fi, license-assisted access (LAA), or NR-Unlicensed (NR-U), that can access the channel with a finer and more flexible time granularity. In order to improve the robustness of channel access, channel occupancy time (COT) sharing has been proposed for NR SL communications over unlicensed band. After successfully reserving a COT via a full LBT procedure (e.g., a Type 1 LBT), including extended channel clearance assessment (ECCA) over a non-trivial number of 9-µs slots, a SL UE can share this COT with other SL UEs which may then use to transmit after successfully performing an abbreviated LBT procedure (e.g., a Type 2 LBT), such as a one-shot CCA for 16-µs or 25-µs.

COT-sharing may lead to heterogeneity among sidelink radio resources. When conducting autonomous sensing/channel selection in Mode 2 sidelink operations, a SL UE may prefer a resource with the abbreviated Type 2 LBT because of the potentially higher LBT success rate or/and lower power consumption. However, this can lead to "local" congestion over the set of such resources with a favorable LBT opportunity when multiple SL UEs are attempting the same channel access simultaneously.

Such local congestion issues can be avoided by using an opportunistic COT-sharing on top of the legacy sensing/resource selection procedure specified in Rel 16. A sidelink resource may be selected using the legacy procedure, as if there were no COT-sharing opportunity. When the selected resources happens to be within a COT-sharing opportunity provided by another SL UE, the selected resource may then accessed using the abbreviated Type 2 LBT procedure. The drawback of this baseline approach is that the potential benefits of COT-sharing are not fully exploited. The various aspects of the present disclosure are directed to defining sub-resource pools that can be used as containers for respective sets of heterogeneous sidelink resources, which facilitate SL UEs to perform COT-sharing aware sensing/resource selection, to access a sub-resource-pool with appropriate congestion control to avoid local congestion, and to choose among respective sub-resource-pools according to a QoS requirement for pending or on-going sidelink data transmission. System-wise, configuring sub-resource pool resources provides an additional degree of freedom for channel access optimization without losing the benefit of statistical multiplexing over a static transmission resource pool splitting.

Figure 3:
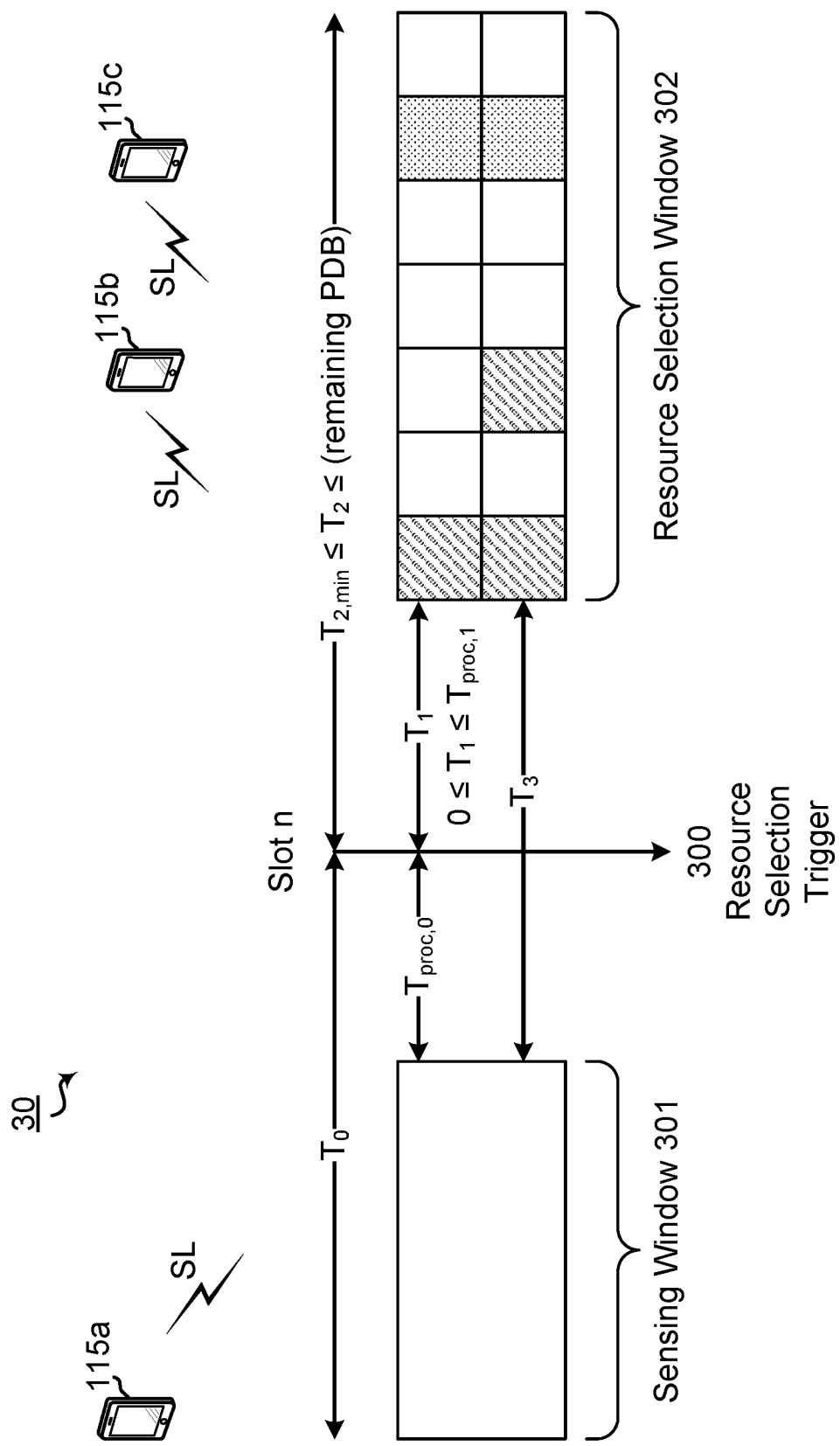
FIG. 3 is a block diagram of an example wireless communications system that supports sub-resource pools for transmission of NR SL transmissions over unlicensed bands according to one or more aspects.

FIG. 3 is a block diagram illustrating an example NR network configured for sidelink communications over unlicensed spectrum between any one or more of UEs. An available set of resources for sidelink communications is identified at slot n. With identification of such resources of slot n, a sidelink transmitting UE, such as UE 115a, may define sensing window 301 prior to resource selection trigger 300, and resource selection window 302 after resource selection trigger 300. When a resource selection is triggered at slot n, resource selection trigger 300, UE 115a physical (PHY) layer may examine the shared spectrum during sensing window 301 to identify the set of candidate resources in resource selection window 302 and reports to the medium access control (MAC) layer of UE 115a. Specifically, $T_1$ is a UE implementation value being not larger than $T_{proc,1}$, represents the processing time for UE 115a for any detected signals during sensing window 301 and preparation for transmission in one or more of the selected sidelink candidate resources of resource selection window 302. Among the candidate resources reported by the PHY layer of UE 115a, the MAC layer of UE 115a would then randomly select one or more of the candidate resource blocks of resource selection window 302 for transmission.

It should be noted that the PHY layer of UE 115a may read COT-sharing indications sent by other SL UEs and report to the MAC layer which resources can be accessed with a Type 2 LBT.

It should further be noted that where the intended sidelink communications with reservation for hybrid automatic receipt request (HARQ) retransmission, the sidelink transmission resources for multiple PSSCHs for the same transport block (TB) may be randomly selected by the MAC layer of UE 115a as well.

In addition, a NR sidelink transmitting UE, such as UE 115a, with 5G NR operations in Mode 2 would continuously sense channel up to $T_3$ before the actual TX selected (referred to as "last-minute re-evaluation"). The MAC layer of UE 115a may request the PHY layer at this instant to double check whether the coming resource, as well as other reservations in the future, are still available. The PHY layer of UE 115a responds to the MAC layer regarding all available resources at this instant and, if the resource for the coming PSSCH is not available anymore, UE 115a sets the re-selection flag to the MAC layer. After receiving this flag, the MAC layer of UE 115a will randomly re-select a resource from available candidate resource sets of resource selection window 302. This may lead to a new $T_3$ based the re-evaluation. Otherwise, the PHY layer of UE 115a may expect to transmit over the pre-selected sidelink resource.

Figure 4:
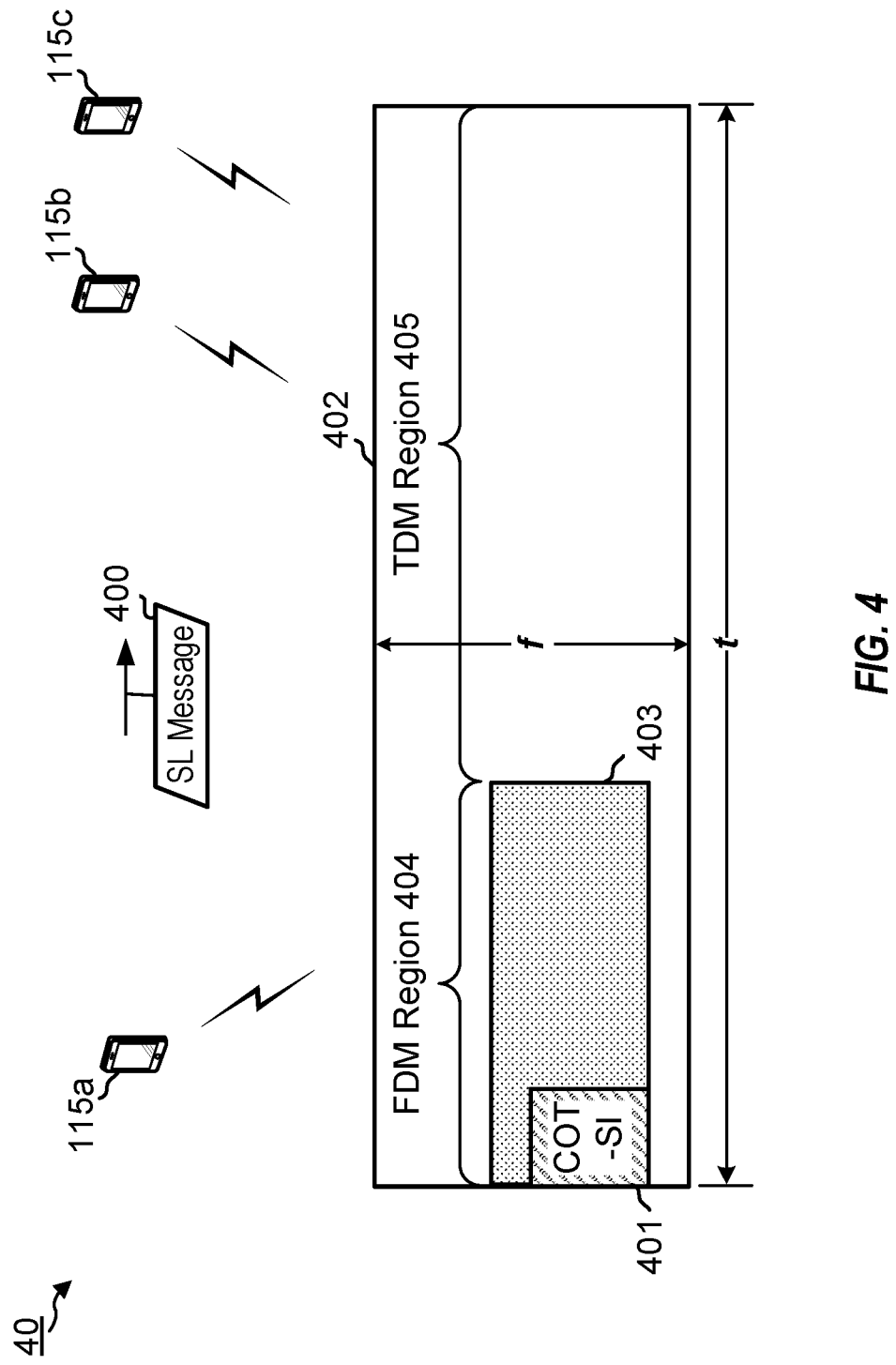
FIG. 4 is a block diagram illustrating wireless communications systems having UEs configured for COT-SI indications for NR SL operations.

FIG. 4 is a block diagram illustrating wireless communications systems having UEs configured for COT-SI indications for NR SL operations. After performing a successful LBT procedure, UE 115a may secure COT 402 within the shared communication spectrum of wireless communications system 40. UE 115a determines the time and frequency resources (t×f) defining COT 402. In generating the structure information for COT-SI 401, UE 115a may also determine a set of time and frequency resources defining a reserved set of resources, reserved resource region 403. UE 115a may then transmit COT-SI 401 via SL message 400 to neighboring UEs, such as UEs 115b and 115c. COT-SI 401 will include the remaining duration of COT 402, the time and frequency resources (t×f) defining COT 402, and the set of time and frequency resources defining reserved resource region 403.

By including the set of time and frequency resources defining reserved resource region 403, UE 115a provides additional information to UEs 115b and 115c that defines a sharable FDM region and a sharable TDM region within COT 602. Other UEs, such as UEs 115b and 115c, can perform TDM sharing in the sharable TDM region, and FDM sharing in the sharable FDM region. UEs 115b and 115c may also mark any resources in the above FDM region or/and TDM region as Type 2 LBT-eligible when the COT-sharing conditions are satisfied. UEs 115b and 115c will also know that reserved resource region 403 is not sharable and, thus, UEs 115b and 115c will not attempt access to the shared communication spectrum within COT 402 that falls within reserved resource region 403. Such an enhanced design may to take advantage of the bursty nature of these transmissions, such as with enhanced mobile broadband (eMBB) traffic.

Reserved resource region 403 may be defined in the form of a time/frequency domain rectangle as a product of a set of frequency domain resources and continuous time domain resources. The set of frequency domain resources may be implemented as a set of continuous subchannels where legacy waveforms are used, or may be a set of non-continuous interlaces where interlaced waveforms are used.

Figure 5:
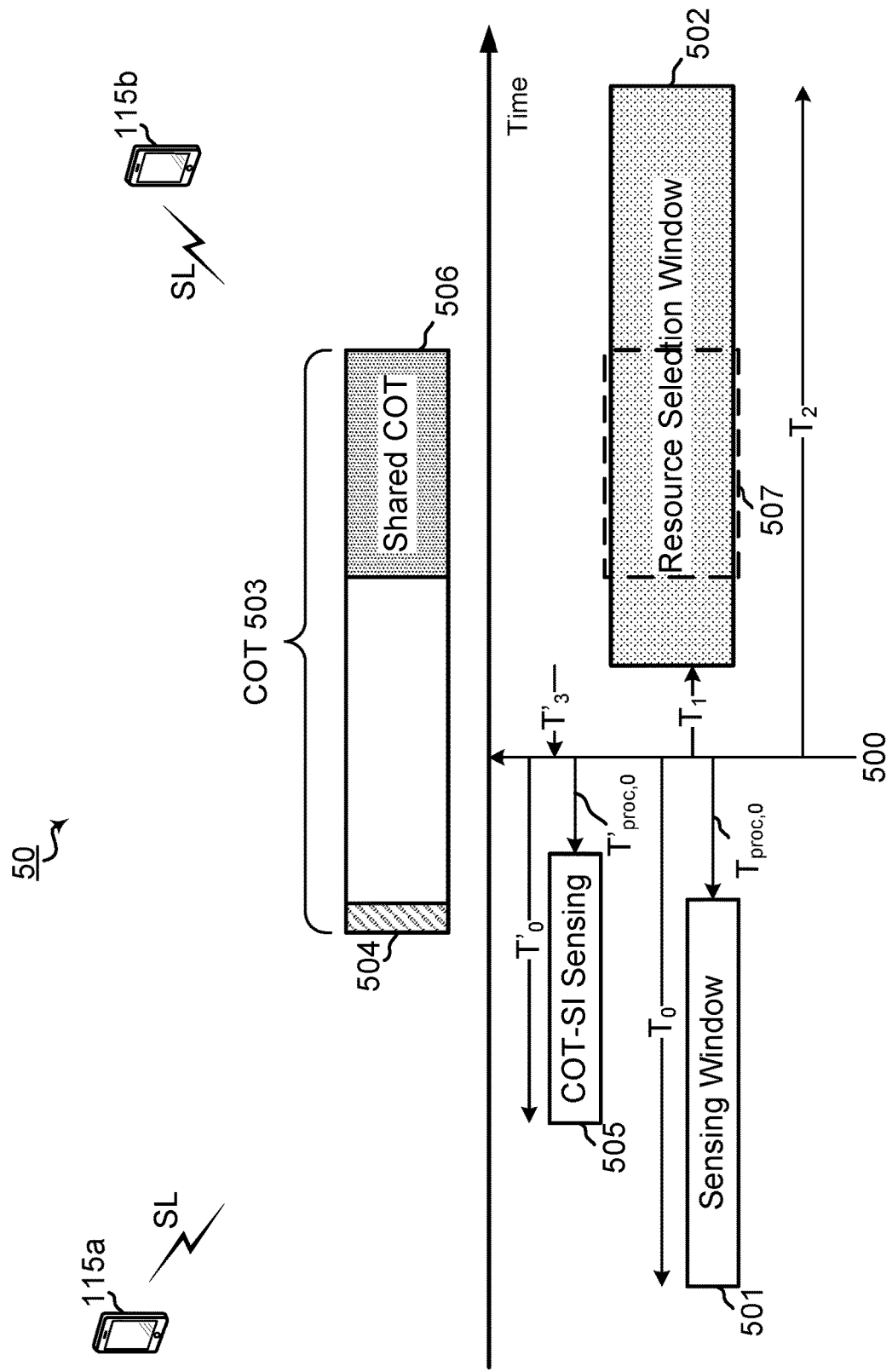
FIG. 5 is a block diagram illustrating an example NR network with UEs configured for sidelink communications.

FIG. 5 is a block diagram illustrating an example NR network with UEs configured for sidelink transmissions. Upon resource selection trigger 500, UE 115a examines in sensing window 501 if resources within resource selection window 502 are within the UE 115a's own COT 502 or other UE's COT 503, such as UE 115b. UE 115a may examine for resource SCI messages within sensing window 501 to determine if the resources within resource selection window 502 are reserved. UE 115a may perform the COT-SI sensing within sensing window 501 upon receiving resource selection trigger 500. However, in an additional aspect of the present disclosure, UE 115a may perform the COT-SI sensing in COT-SI sensing window 505, which may start from $n-T_0'$ or $n-T_{proc,0}'$ before the trigger at n, where $T_0' \leq T_0$ and $T_{proc,0} \leq T_{proc,0}$.

UE 115a may detect COT-SI 504 from UE 115b identifying COT 503 and a shared COT region 506. COT-SI 504 may indicate the UE 115b's own COT, COT 503, or shared COT region 506 within the same COT and COT duration ≤10 ms. When UE 115a detects COT-SI 504 that identifies shared COT region 506 from UE 115b, it defines Type-0 effective resource selection window 507. Channel access during Type-0 effective resource window 507 may be configured using the abbreviated Type 2 LBT procedures, while channel access during the remainder of resources within resource selection window 502 may be configured using the full Type 1 LBT procedure. UE 115a can prioritize the Type-0 effective resource selection window 507 over remaining resources for a higher LBT success rate. Following the same philosophy, UE 115a can switch to an abbreviated Type 2 LBT procedure if it found in the last-minute re-evaluation within $T'_3$ that the selected resource is within Type-0 effective resource selection window 502.

As noted, an NR SL UE in Mode 2, such as UE 115a, may continuously sense the channel up to $T_3'$ before the actual transmission, referred to herein as the "last-minute re-evaluation." At this instant, the MAC of UE 115a would request the PHY layer to report the updated set of available resources to double check whether the previously selected resource is still available. Besides the set of available resources, the PHY layer responds to the MAC layer with other indication. If the previously selected resource is not available, the PHY layer may set a re-selection flag for the MAC layer, triggering the MAC layer to re-select a resource from the set of available resources. Otherwise, the MAC layer can command the PHY layer to transmit over the previously selected resource. With COT-sharing in this case, the PHY layer may inform the MAC layer of the updated LBT type of the selected resource. For example, the update may identify that the abbreviated Type 2 LBT, instead of the full Type 1 LBT originally assumed for the selected resource, can be allowed due to newly received COT-sharing indication, COT-SI 504.

Figure 6:
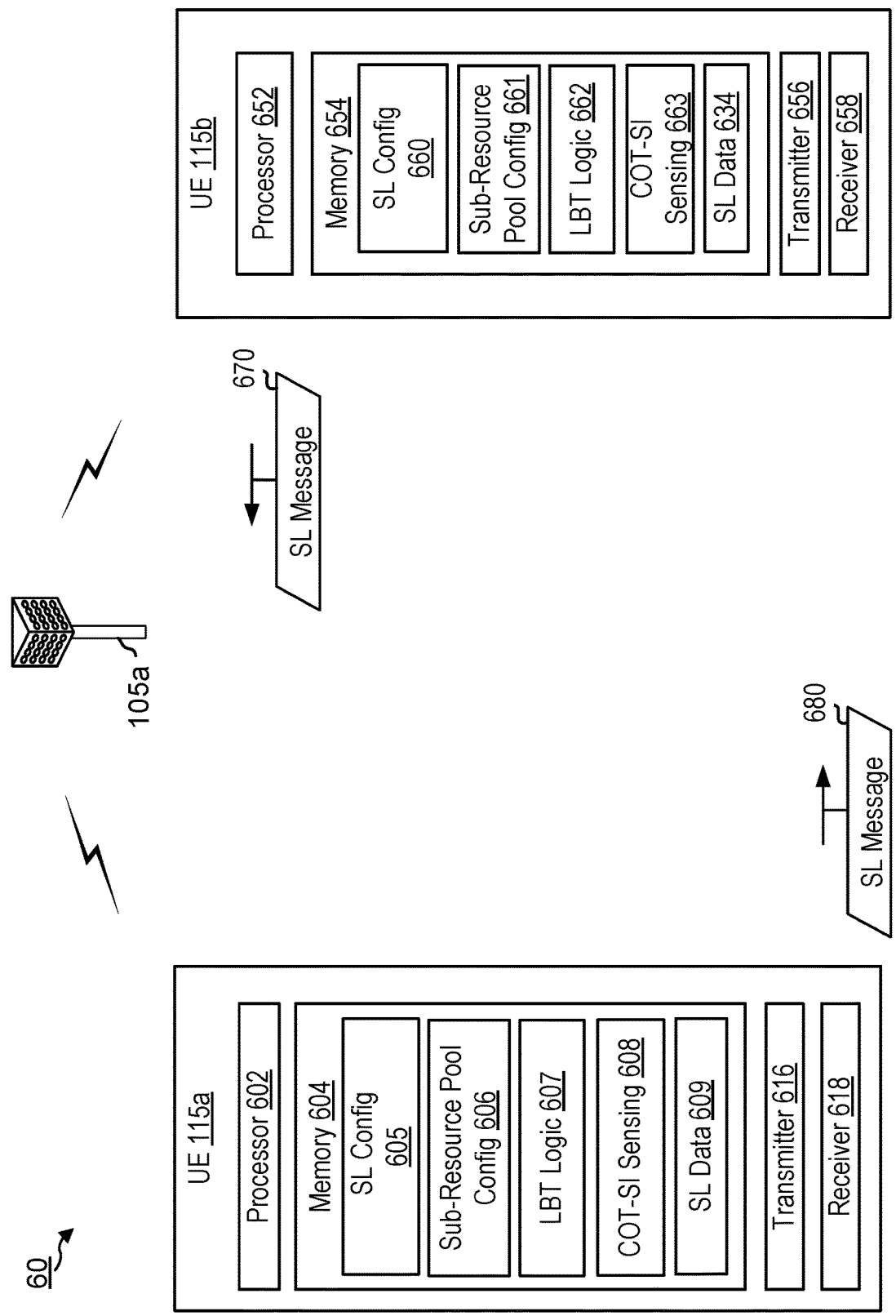
FIG. 6 is a block diagram of an example wireless communications system that supports sub-resource pools for transmission of NR SL transmissions over unlicensed bands according to one or more aspects.

FIG. 6 is a block diagram of an example wireless communications system 600 that supports sub-resource pools for transmission of NR SL transmissions over unlicensed bands according to one or more aspects. In some examples, wireless communications system 600 may implement aspects of wireless network 100. Wireless communications system 600 includes UEs 115a and 115b and base station 105a. Although two UEs and one base station are illustrated, in some other implementations, wireless communications system 600 may generally include multiple UEs, similar to UEs 115a and 115b, and may include more than one base station, similar to base station 105a.

UEs 115a and 115b may include a variety of components (such as structural, hardware components) used for carrying out one or more functions described herein. Detail of such variety of components have been described with respect to UE 115 of FIG. 2. For example, these components may include one or more processors 302/352 (hereinafter referred to respectively as "processor 602" and "processor 652"), one or more memory devices 604/654 (hereinafter referred to respectively as "memory 604" and "memory 654"), one or more transmitters 616/656 (hereinafter referred to respectively as "transmitter 616" and "transmitter 656"), and one or more receivers 618/658 (hereinafter referred to respectively as "receiver 618" and "receiver 658"). Processor 602 and processor 652 may be configured to execute instructions stored in memory 604 and memory 654, respectively, to perform the operations described herein. In some implementations, processor 602 or processor 652 may include or correspond to one or more of receive processor 258, transmit processor 264, and controller 280, as illustrated in FIG. 2, and memory 604 or memory 654 may include or correspond to memory 282, as illustrated in FIG. 2.

As illustrated, memory 604 and memory 654 include or are configured to store sidelink configuration 605/660, sub-resource pool configuration logic 606/661, LBT logic 607/662, COT-SI sensing logic 608/663, and sidelink data 609/634. NR SL UEs, such as UEs 115a and 115b, which are capable of performing sidelink communications may receive sidelink configuration information from base station 105a, via receiver 618/658. This configuration information would be stored in memory 604/654 at sidelink configuration 605/660. According to the aspects describe herein, the sidelink configuration message includes identification of a plurality of channel access types associated with a plurality of sub-resource pools for autonomous sidelink access of a shared communication channel.

In operation from the perspective of UE 115a, UEs 115a may obtain information, stored in memory 604 at sidelink data 609, for a sidelink transmission over a transmission resource pool allocated for the autonomous sidelink access. Under control of processor 602, UE 115a executes sub-resource pool configuration logic 606 for implementing the functionality of the various aspects. Execution of the instruction and code of sub-resource pool configuration logic 606 (referred to herein as the "execution environment" of sub-resource pool configuration logic 606) enables the functionality for UE 115a to determine a plurality of sub-resource pools from a plurality of available resources within the transmission resource pool. The sub-resource pools may be determined according to a channel access type of each resource of the available resources and includes a subset of resources associated with a corresponding channel access type. The channel access type may further be determined according to a COT sharing occasion, which UE 115a may detect within the execution environment of COT-SI sensing 608.

Within the capabilities of sidelink operations, UE 115a may select a sub-resource pool of the plurality of sub-resource pools from which a resource may be selected for sidelink transmission and transmit, via transmitter 616, the information, as sidelink transmission 680, on a transmission resource selected from the sub-resource pool in response to successful access of the transmission resource according to the channel access type associated with the sub-resource pool.

Figure 7:
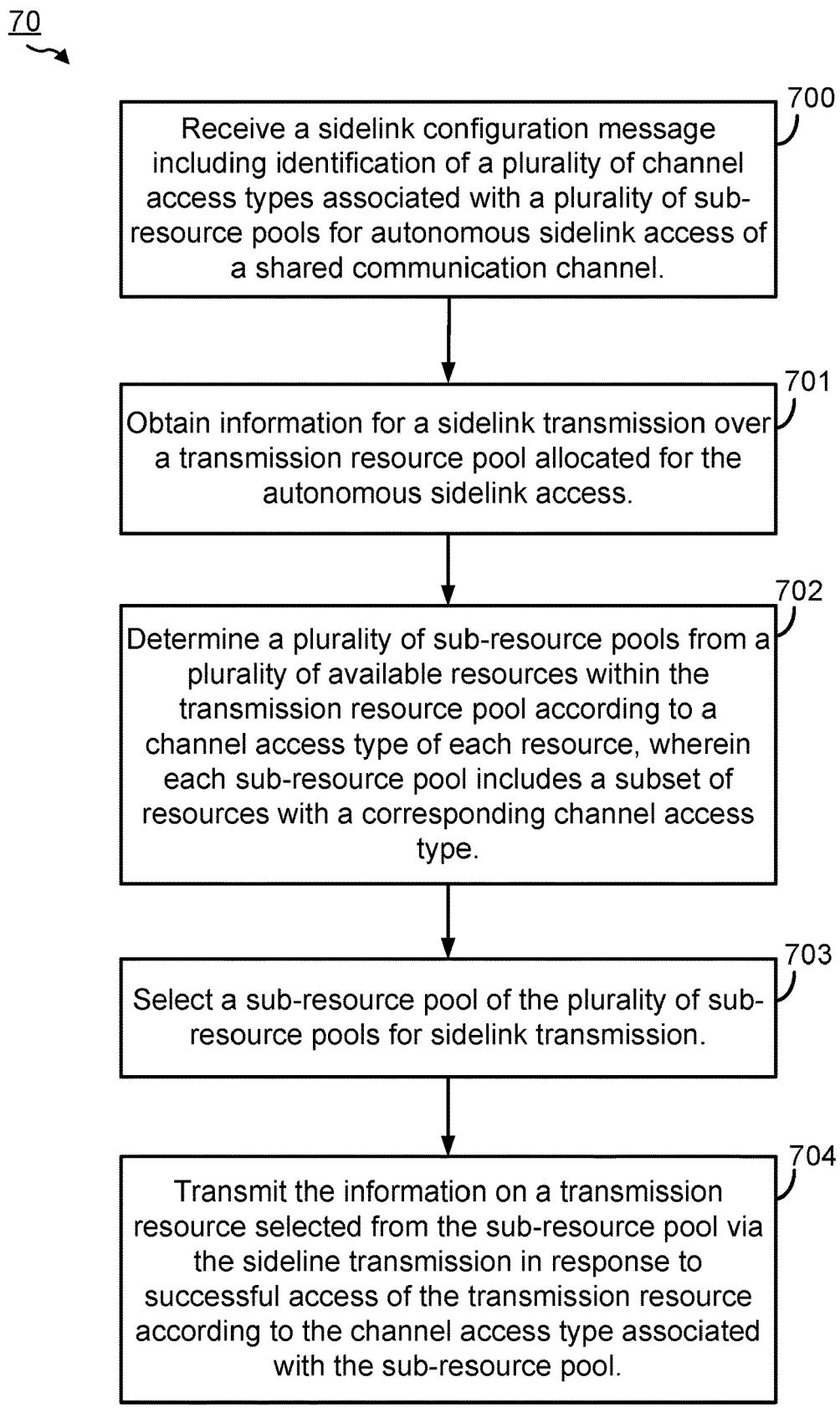
FIG. 7 is a block diagram illustrating example blocks executed by a UE to implement sub-resource pools for transmission of NR SL transmissions over unlicensed bands according to various aspects of the present disclosure.
Figure 13:
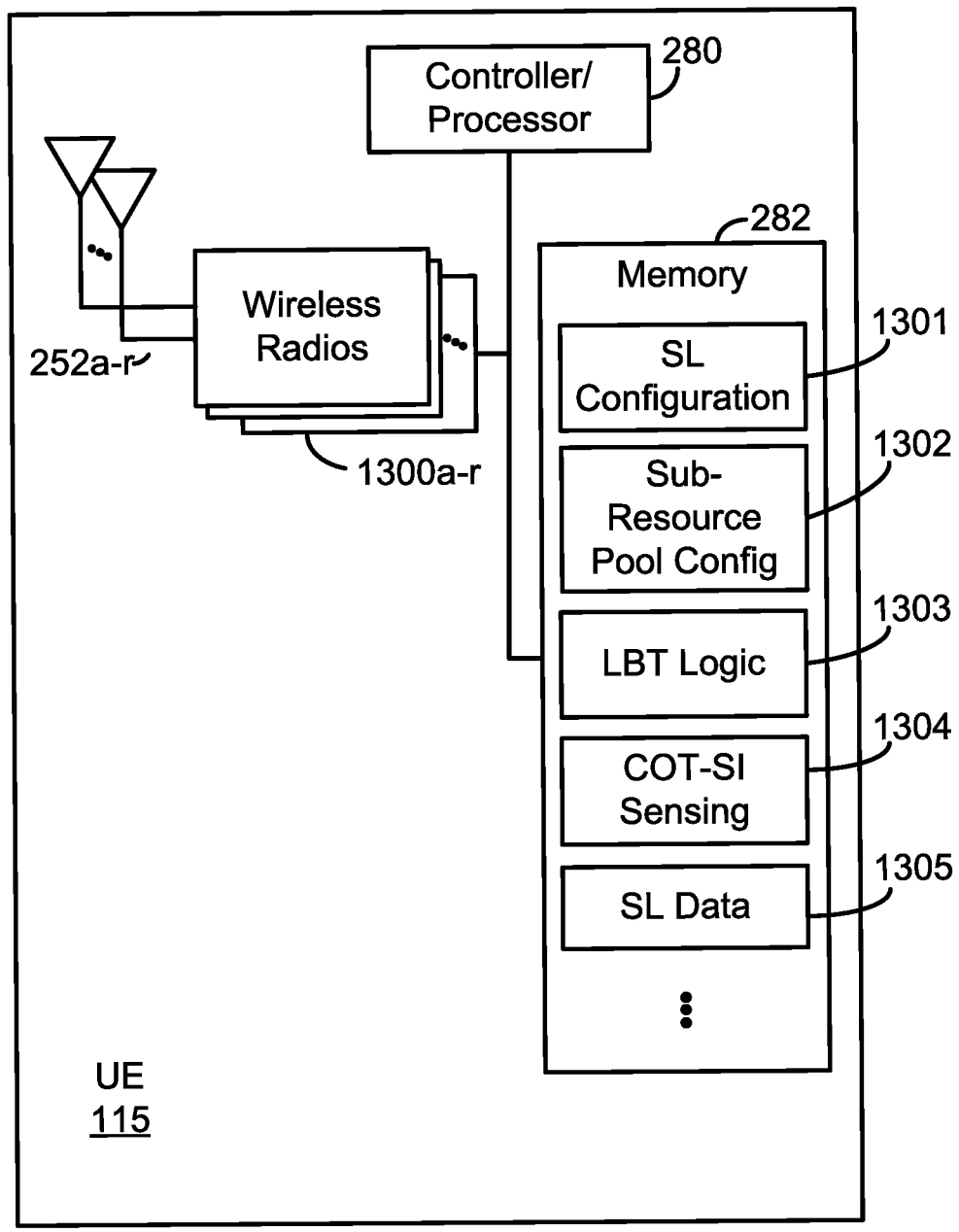
FIG. 13 is a block diagram of an example UE that supports sub-resource pools for transmission of NR SL transmissions over unlicensed bands according to one or more aspects.

FIG. 7 is a block diagram illustrating example blocks executed by a UE to implement sub-resource pools for transmission of NR SL transmissions over unlicensed bands according to various aspects of the present disclosure. The example blocks will also be described with respect to UE 115 as illustrated in FIGS. 2 and 13. FIG. 13 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1300a-r and antennas 252a-r. Wireless radios 1300a-r includes various components and hardware, as illustrated in FIG. 2 for UE 115, including modulator/demodulators 254a-r, MIMO detector 256, receive processor 258, transmit processor 264, and TX MIMO processor 266.

At block 700, an NR SL UE receives a sidelink configuration message from a serving base station, wherein the sidelink configuration message includes identification of a plurality of channel access types associated with a plurality of sub-resource pools for autonomous sidelink access of a shared communication channel. An NR SL UE, such as UE 115, receives the sidelink configuration message from a base station via antennas 252*a-r* and wireless radios 1300*a-r* and stored in memory 282 at sidelink configuration 1301. The sidelink configuration information may include identification of channel access types associated with sub-resource pools for autonomous sidelink access of a shared communication channel.

At block 701, the NR SL UE obtains information for a sidelink transmission over a transmission resource pool allocated for the autonomous sidelink access. UE 115 may obtain sidelink data, as stored in memory 282 at sidelink data 1305 either by generating the information through operations of a local procedure or may receive the information from another network node (e.g., base station or UE).

At block 702, the NR SL UE determines the plurality of sub-resource pools from a plurality of available resources within the transmission resource pool In implementing the sidelink operation capability, UE 115 would use the sidelink configuration information to determine various sub-resource pools from the available resources within the transmission resource pool of the resource selection window. UE 115 determines such sub-resource pools according to a channel access type of each resource, wherein each sub-resource pool includes a subset of resources associated with the corresponding channel access type. The channel access type may further be determined according to a COT sharing occasion, which UE 115 may detect within the execution environment of COT-SI sensing 1304.

At block 703, the NR SL UE selects a sub-resource pool of the plurality of sub-resource pools for sidelink transmission. Within the capabilities of sidelink operations, UE 115 may select a sub-resource pool from which a resource may be selected for sidelink transmission.

At block 704, the NR SL UE transmits the information on a transmission resource selected from the sub-resource pool via the sideline transmission in response to successful access of the transmission resource according to the channel access type associated with the sub-resource pool. UE 115 may then transmit, via wireless radios 1300*a-r* and antennas 252*a-r*, the information on a transmission resource selected from the sub-resource pool in response to successful access of the transmission resource according to the channel access type associated with the sub-resource pool.

Figure 8:
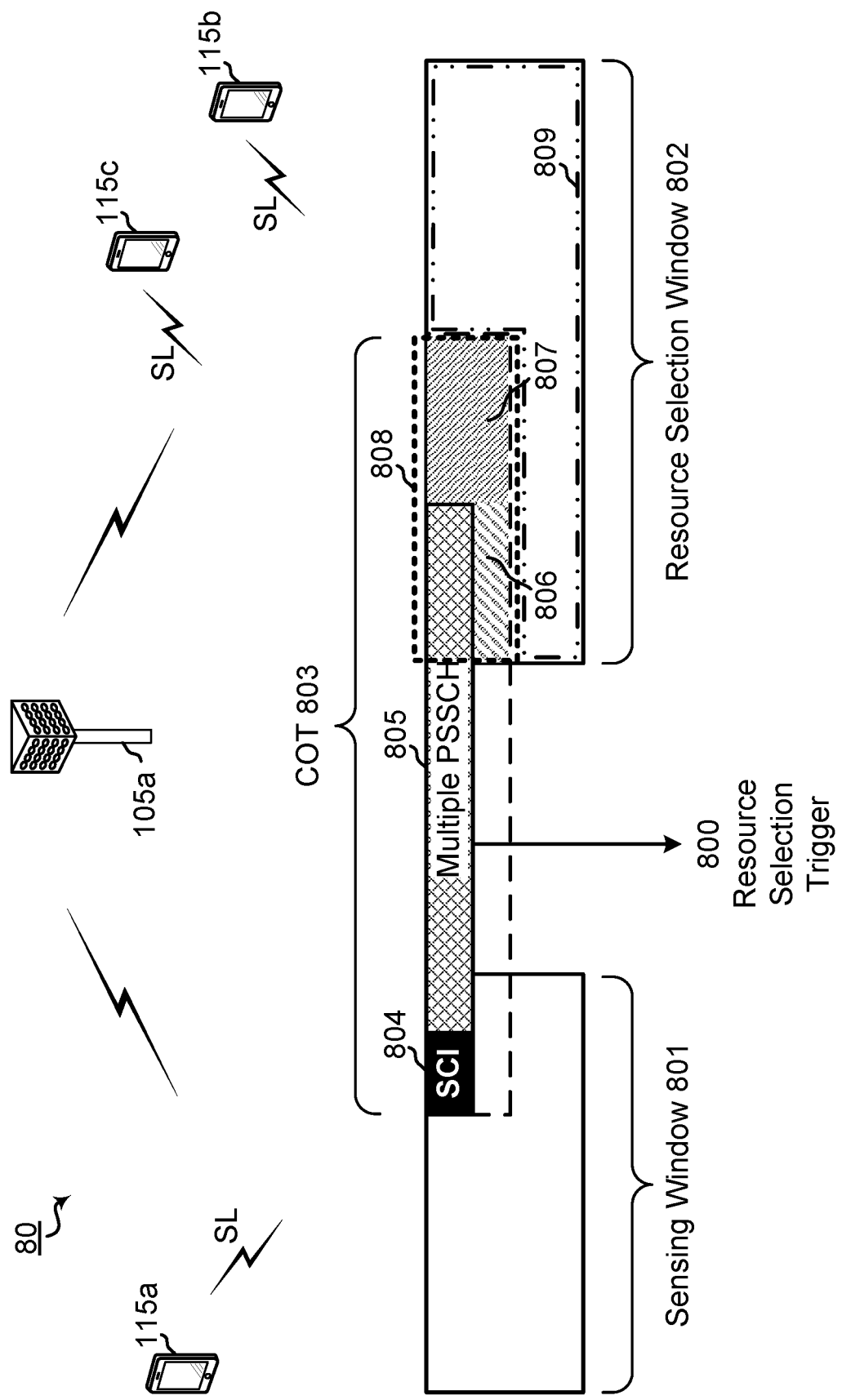
FIG. 8 is a block diagram illustrating an example wireless communications system that supports sub-resource pools for transmission of NR SL transmissions over unlicensed bands according to one or more aspects of the present disclosure.

FIG. 8 is a block diagram illustrating an example wireless communications system 80 that supports sub-resource pools for transmission of NR SL transmissions over unlicensed bands according to one or more aspects of the present disclosure. UE 115*a* obtains information for sidelink transmissions over the shared communication channel. Operating in Mode 2, UE 115*a* will sense during sensing window 801 for available resources of the transmission resource pool within resource selection window 802. The transmission resource pool identifies the available resources within resource selection window 802. According to aspects of the present disclosure, multiple sub-resource pools may be defined and identified in the transmission resource pool as containers for respective sets of resources that can be accessed differently. UEs, such as UEs 115*a* and 115*b*, may receive a sidelink configuration message from base station 105*a* that includes identification of a plurality of channel access types associated with a plurality of sub-resource pools for autonomous sidelink access of the shared communication channel.

For example, UE 115*b* includes a COT-SI within SCI 804 indicating both an FDM-based sharing opportunity and a TDM-base one sharing opportunity. This SCI 804 falls within sensing window 801 of UE 115*a*. With the sharing of COT 803 between UE 115*a* and 115*b*, UE 115*a* identifies a sub-resource pool 808 including the resources of the transmission resource pool of resource selection window 802 that overlap with COT 803 shared with UE 115*b*. As a shared part of COT 803, UEs may access the resources within sub-resource pool 808 using an abbreviated Type 2 LBT. Within sub-resource pool 808, there is a region 806 for FDM-based sharing of resources and a region 807 for TDM-based sharing created by the resources allocated for COT 803 unused by transmission of multiple sidelink transmissions (multiple PSSCH 805) by UE 115*b*. All of the other resources within the transmission resource pool of resource selection window 802 may be accessed using the full Type 1 LBT procedure. In other example implementations, each sharing region of the shared portion of COT 803 may include different access types and, thus, UE 115*a* identifies different sub-resource pools for region 806 and region 807. For example, resources within the sub-resource pool identified for region 806 may be accessed via the abbreviated Type 2 LBT, while the resources within the sub-resource pool identified for region 807 may be accessed according to a predetermined channel hopping sequence, while the remaining resources within the transmission resource pool of resource selection window 802 may still be accessed using the full Type 1 LBT procedure.

It should be noted that each sub-resource-pool can be specified with respective congestion control/channel access setup's to provide diversified channel access and, more importantly, without "local" congestion. Dynamic sub-resource-pools within a transmission resource pool may avoid loss in the statistical multiplexing benefit in contrast to pursuing similar flexibility or diversity that may be achieved with static resource pool splitting.

When operating autonomous channel access (e.g., Mode 2 in Rel 16) over a transmission resource pool in an unlicensed band that uses LBT access procedures, a NR SL UE, such as UEs 115*a* and 115*b*, can be configured to define multiple sub-resource pools as containers of sets of radio resources using different types of LBT, as noted above. In such operations, a transmission resource pool can have a sub-resource-pool that can be accessed with an abbreviated Type 2 LBT procedure when COT-sharing is allowed, and another sub-resource-pool using the full Type 1 LBT. For example, sub-resource pool 808, which includes the FDM-based sharing region 806 and the TDM-based sharing region 807, may be identified as accessible via the abbreviated Type 2 LBT procedure. UE 115*a* may further identify a sub-resource pool 809 that includes the remaining resources within the transmission resource pool of resource selection window 802 other than the resources within sub-resource pool 808. This sub-resource pool 809 may be identified as accessible via the full Type 1 LBT procedure.

The different types of LBT access procedures for sub-resource pool 808 and sub-resource pool 809 may lead to different success rates or/and may consume different amounts of energy, which may introduce heterogeneity among available sidelink resources. To avoid "local" collision in a sub-resource pool that attracts strong preference from many SL UEs, an NR SL UE, such as UEs 115*a* and 115*b*, can be configured to execute per sub-resource-pool congestion control. The congestion control mechanisms can be different in parameter or in congestion control algorithm. For example, both sub-resource pool 808 and sub-resource pool 809 may both use CBR/CR congestion control. However, the mapping of CBR to CR limit may be different between the two in order to discourage too much local collision of access attempts to sub-resource pool 808 with the more favorable access type. Alternatively, sub-resource pool 808 and sub-resource pool 809 may employ different congestion control algorithms. For example, sub-resource pool 808 may use a CBR/CR congestion control, while second sub-resource pool 809 may use a virtual collision-based congestion control.

As used herein, the term "virtual collision" can refer to an event detected during a last-minute evaluation (e.g., re-evaluation) of a resource (e.g., a time-frequency resource). In particular, a virtual collision may occur with respect to a certain resource when a first UE selects the resource for transmission and, during a last-minute evaluation of the resource prior to the transmission, the first UE determines that a second UE has reserved the resource (e.g., via an SCI). For instance, the first UE may receive a re-selection flag associated with the resource that indicates the resource as unavailable. In some examples, a re-selection flag value of 1 may indicate the resource is unavailable and a re-selection flag of value of 0 may indicate the resource is available, or vice versa. In response to determining that the second UE has reserved the resource, the first UE may re-select a different resource for the transmission, avoiding simultaneous use of the resource by the first UE and the second UE that may have otherwise occurred. To that end, because the first UE reselects a transmission resource, the potential collision between the first UE and the second UE is virtual (e.g., hypothetical).

A virtual collision may result from multiple UEs attempting to reserve the same resource. Thus, the number and/or frequency of virtual collisions within a channel may increase with increasing channel congestion (e.g., traffic). Accordingly, metrics and/or statistics (e.g., mean, median, mode, rate, and/or the like) associated with the virtual collisions detected by a UE and/or on a channel may provide an indication of congestion on the channel (the sidelink resource pool). For instance, a virtual collision metric may correspond to a total number (e.g., quantity) of virtual collisions detected on a channel by a UE over time or within a certain time period (e.g., a rolling window). That is, for example, the virtual collision metric may correspond to a count of the re-selection flags set to indicate that a resource is unavailable, as described above. Additionally or alternatively, the virtual collision metric may correspond to an average number of virtual collisions per a time period, per communication (e.g., transmissions) on a channel, per resources selected for transmission, per sub-resource pool, and/or the like. The virtual collision metric may correspond to a virtual collision rate. In this way, the virtual collision metric may provide an indication of a frequency of virtual collisions over time. The virtual collision metric may correspond to a number of potential collisions on a channel, such as the total number of resources that are unavailable on the channel (e.g., during resource selection for transmission and/or during a last-minute re-evaluation). The virtual collision metric may represent a percentage of time that the channel is determined to be occupied. Further, the virtual collision metric may be determined based on a log of unavailable resources, virtual collisions (e.g., re-selection flags), and/or the like.

In another example aspect illustrated in FIG. 8, the COT-sharing opportunity with COT 803 allows for UE 115a to identify a first sub-resource pool for region 806 representing the FDM-based access in the shared portion of COT 803, a second sub-resource pool for region 807 representing the TDM-based access in the shared portion of COT 803, and a third resource pool, sub-resource pool 809, representing the remaining resources of the transmission resource pool of resource selection window 802 exclusive of the resources in the shared portions of COT 802 at regions 806 and 807. In one example implementation, UE 115a may identify the first sub-resource pool for region 806 may be accessed using an abbreviated Type 2 LBT procedure with a 16 µs one-shot clear channel assessment (CCA), the second sub-resource pool for region 807 may be accessed using an abbreviated Type 2 LBT procedure with a 25 µs one-shot CCA, and the third resource pool, sub-resource pool 809 may be accessed using a full Type 1 LBT procedure. At a given sensing instance a resource can be classified into any of the sub-resource pools depending on the presence of COT-sharing indications.

In an additional aspect, NR SL UEs, such as UEs 115a and 115b, may be configured to access a sub-resource-pool after examining the congestion control feature in different ways. Each set of resources, such as the transmission resource pool and the one or more sub-resource pools identified by the UEs, such as UE 115a, may have its own congestion control algorithm or may have its own congestion control parameter when operating the same congestion control algorithm or feature. In a first optional implementation, UE 115a may examine the congestion control feature both associated with the transmission resource pool of the resource selection window 802 and the associated with the sub-resource pool (e.g., the sub-resource pools of regions 806 and 807, or sub-resource pool 809). In a second optional implementation, UE 115a may examine the congestion control feature of the transmission resource pool and not any of the sub-resource pools. Thus, UE 115a may determine that its planned access would comply with, in one implementation, the congestion control feature of both sets of resources before attempting access to the selected resource, and in another implementation, the congestion control feature of the more general transmission resource pool before attempting access to the selected resource.

In one specific example of such implementations, the congestion control feature includes a CBR/CR limit. In the first optional implementation, UE 115a may examine both the CR limit of the transmission resource pool and that of the sub-resource-pool of the selected resource before attempting access. In the second optional implementation, UE 115a may examine the CR limit of the transmission resource pool before attempting access.

It should be noted that in additional aspects of the present disclosure, UE 115a may be configured to report the per sub-resource pool CBR to the network via base station 105a. For example, UE 115a may be configured to report the per sub-resource pool CBR to base station 105a periodically or in at an event driven rate (e.g., in response to receiving sidelink data, local collisions above a certain threshold level, etc.). The CBR report can be sent to base station 105a together with the average size or number of resources in the sub-resource pools or may be sent with additional information, such as how many opportunities have been identified for a the sub-resource-pool having a particular channel access type over a given window. Base station 105a may then use this CBR information to encourage or discourage neighboring NR SL UEs, such as UE 115c, on COT-sharing.

It should be noted that in various aspects, an identified sub-resource pool can be considered as the default sub-resource pool of the transmission resource pool. For example, where a sub-resource pool is linked to the same channel access type as the access type of the transmission resource pool, that sub-resource pool may be considered to be a default type. In such an implementation, UE 115a would either not maintain a per sub-resource pool congestion control feature (e.g., CBR and CR, a virtual collision-based mechanism, etc.) or be configured to ignore checking the per-sub-resource pool congestion control mechanism. According to such various aspects that include defining a default sub-resource pool, the identification of the default pool may be configured for the pools that share the dominant channel access type configured by the network, whether statically or dynamically, over the transmission resource pool.

For various aspects of the present disclosure which implement the CBR/CR limits as a per-sub-resource pool congestion control feature, there may be two options to define the CR limit for a sub-resource-pool. In a first option, the CR limit may be a function of the CBR of the particular sub-resource pool associated with the selected resource. For example, if UE 115a has selected a resource in the sub-resource pool identified for region 807, the CR limit to be managed by UE 115a before attempting access may be defined as a function of the CBR calculated for the sub-resource pool for region 807. In a second option, the CR limit may be a function of the CBR of the transmission resource pool. For example, if UE 115a has selected a resource in the sub-resource pool identified for region 806, the CR limit to be managed by UE 115a before attempting access may be defined as a function of both the CBR calculated for the transmission resource pool of resource selection window 802 and the CBR calculated for the sub-resource pool for region 806.

In additional aspects of the present disclosure an NR SL UE, such as UEs 115a and 115b, can generate an intermediate CBR estimate for a sub-resource-pool per sensing instance. Generation of an intermediate CBR estimate may be triggered by layer 2 or layer 3 signaling. For example, generation of the intermediate CBR may be triggered resource selection trigger 800 (layer 2) arising due to arrival of a new data packet for sidelink transmission. Generation of the intermediate CBR estimate may also be triggered as a part of the $T_3$ re-evaluation of the selected resource (layer 2). In each such layer 2-triggered option, UEs 115a and 115b may use an extended field for reporting the intermediate CBR from the PHY layer of the UE to the MAC layer. Generation of the intermediate CBR may also be triggered in a new sensing opportunity for the CBR estimate (layer 3), either on a periodic basis or event-driven. When triggered with a new sensing opportunity, the NR SL UE, UEs 115a, for example, would be configured with sensing window 801 to read an over-the-air (OTA) COT-SI, such as the COT-SI within SCI 804 transmitted by UE 115b. The intermediate CBR estimate generated in each such example can include the number of total sub-channels and the number of busy sub-channels that have been sensed in the particular instance.

It should be noted that the legacy CBR estimate may be generated without a sensing window when using received signal strength indicator (RSSI) to detect the "busy" sub-channels.

Figure 9:
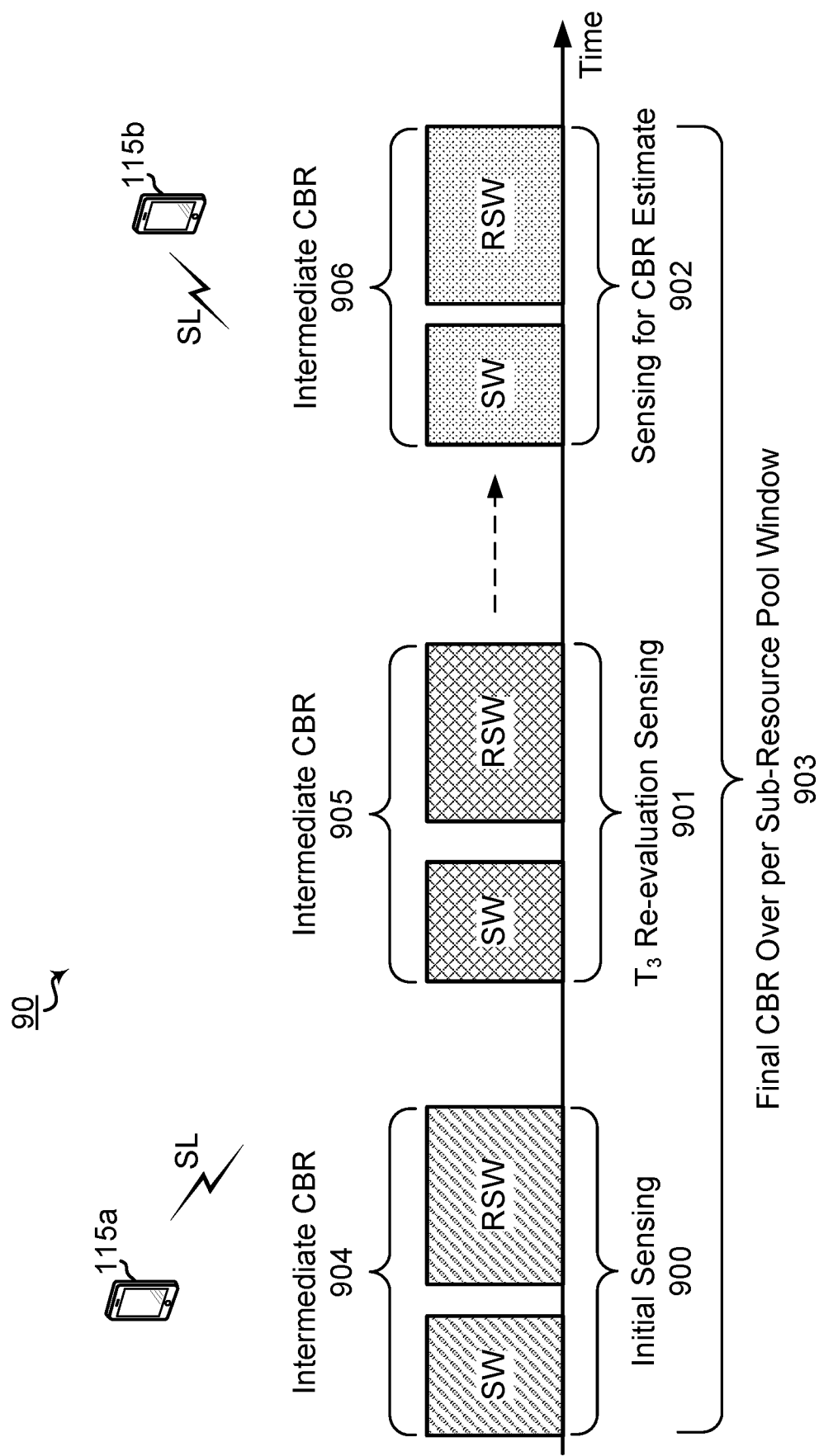
FIG. 9 is a block diagram illustrating an example wireless communications system that supports sub-resource pools for transmission of NR SL transmissions over unlicensed bands according to one or more aspects of the present disclosure.

FIG. 9 is a block diagram illustrating an example wireless communications system 90 that supports sub-resource pools for transmission of NR SL transmissions over unlicensed bands according to one or more aspects of the present disclosure. Additional aspects may provide for NR SL UEs, such as UEs 115a and 115b, can be configured with a per sub-resource pool CBR window to accumulate the intermediate CBR estimates, such as intermediate CBRs 904-906, generated for a sub-resource pool per sensing instances, such as initial sensing 900, $T_3$ re-evaluation sensing 901, and sensing for CBR estimate 902, respectively. The window lengths of initial sensing 900, $T_3$ re-evaluation sensing 901, and sensing for CBR estimate 902 can be different from each other and from that for the final CBR estimate over per sub-resource pool window 903.

It should be noted that, to avoid RSSI contamination from other RATs, or/and inter-subchannel leakage, the NR SL UEs, such as UEs 115a and 115b, can be configured to use SCI/RSRP to detect the "busy" sub-channels.

Additional aspects of the present disclosure may configure NR SL UEs, such as UEs 115a and 115b, to account per sub-resource-pool CR limits in a similar way as for generating intermediate CBR estimates. In such example aspects, UEs 115a or 115b may obtain the intermediate total number of available sub-channels per sensing instance. Further aspects may configure UEs 115a or 115b to obtain the final CR limit by accumulating limits over a per sub-resource-pool CR windows, such as the individual sensing windows for intermediate CBR generation illustrated in FIG. 9 (e.g., initial sensing 900, $T_3$ re-evaluation sensing 901, and sensing for CBR estimate 902, respectively). As noted with respect to intermediate CBR generation, the sub-resource-pool CR window can be different from that for the TX resource pool; and the sub-resource-pool CR window for one sub-resource-pool can be different from that for another sub-resource-pool.

Referring back to FIG. 8, in additional aspects of the present disclosure, a specific sub-resource-pool can be configured to be accessible according to an admission control limitation. That admission control limitation may provide a particular trait or condition of the accessing NR SL UE. In one example implementation, the admission control limitation comprises a priority of data. For example, a pre-defined priority threshold may be configured, such that high priority data that exceeds the threshold can access sub-resource pools of any channel access type, while lower priority data that does not meet the threshold may be limited to access a sub-resource pools having a predetermined channel access type. For example, UE 115a has identified sub-resource pool 808 which may be accessed using an abbreviated Type 2 LBT procedure and sub-resource pool 809 which may be accessed using a full Type 1 LBT procedure. If UE 115a has high priority data that exceeds the pre-defined priority threshold, then UE 115a may attempt to access resource in either sub-resource pool 808 or sub-resource pool 809. In contrast, if UE 115a has data with a priority that does not exceed the threshold, it may attempt access to sub-resource pool 809 and not sub-resource pool 808.

Additional aspects may provide for additional admission control limitations, such that if UE 115a has data with a priority that does not exceed the pre-defined priority threshold, a further admission control limitation may include consideration of the packet delay budget of the data. Such that, even where the data priority does not meet the threshold, UE 115a may still be able to attempt access to the more favorable resources of sub-resource pool 808, with an abbreviated Type 2 access type, when its packet delay budget is smaller than a pre-defined threshold.

In additional aspects of the present disclosure, the admission control limitations may include a battery power level of the NR SL UE. For example, the admission control limitation may be defined with a battery power threshold, such that if the battery power level of the NR SL UE, such as UE 115a, is below the battery power threshold, UE 115a may attempt to access resource in either sub-resource pool 808 or sub-resource pool 809.

Figure 10A:
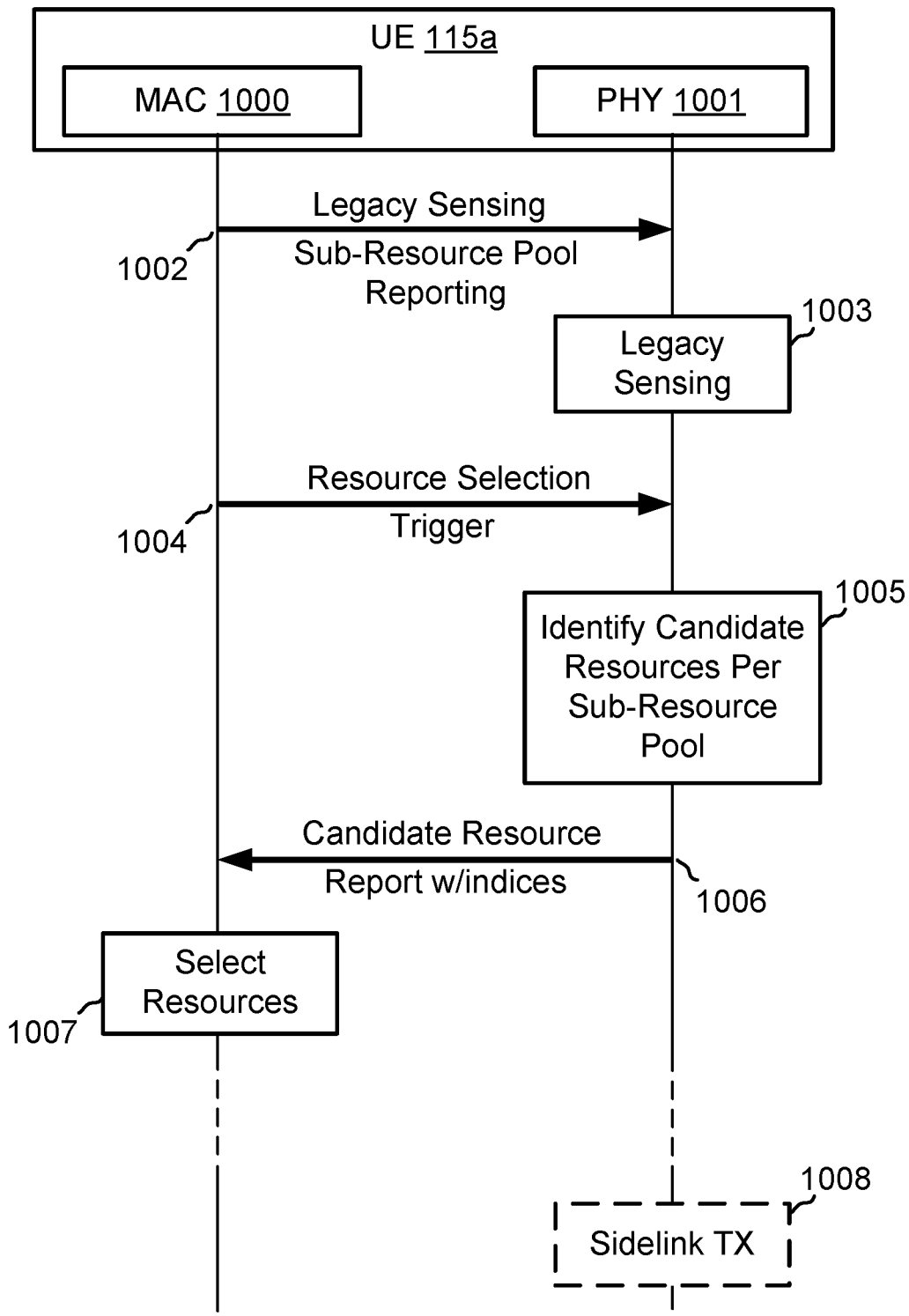
FIGS. 10A-10B are communication flow diagrams of communications between a MAC layer and a PHY layer of a UE configured to support sub-resource pools for transmission over unlicensed bands according to one or more aspects of the present disclosure.

FIG. 10A is a communication flow diagram of communications between a MAC layer 1000 and a PHY layer 1001 of UE 115a configured to support sub-resource pools for transmission over unlicensed bands according to one or more aspects of the present disclosure. For an NR SL UE, such as UE 115a, its MAC layer 1000 can request its PHY layer 1001 to sense with the legacy set-up but report available candidate resources with corresponding sub-resource-pool indices. At 1002, MAC layer 1000 communicates the request to PHY layer 1001 to perform sensing using the legacy set-up for sensing the transmission resource pool of the resource selection window. For example, the legacy layer 3 (L3) signaling set-up for autonomous SL sensing includes the L3-defined configurations of the resource selection window, the sidelink transmission percentage, a threshold PSSCH RSRP, a sidelink multiple reservation resource, the sensing window, sidelink selection window, resource reservation period, and the like. At 1003, PHY layer 1001 uses the legacy configuration to perform sensing at the sensing window of potentially available resources of the resource selection window. At 1004, the resource selection trigger prompts MAC layer 1000 to trigger PHY layer 1001 to identify candidate resources at 1005 over the identified sub-resource pools. PHY layer 1001 may then report the identified candidate resources along with the indices that identify which sub-resource pool the identified candidate resource is located at 1006. With sub-resource-pool indices, MAC layer 1000 can conduct COT-aware resource selection, at 1007, according to one or more of the aspects described here, such as using admission control limitation and perform a sidelink transmission at 1008.

Figure 10B:
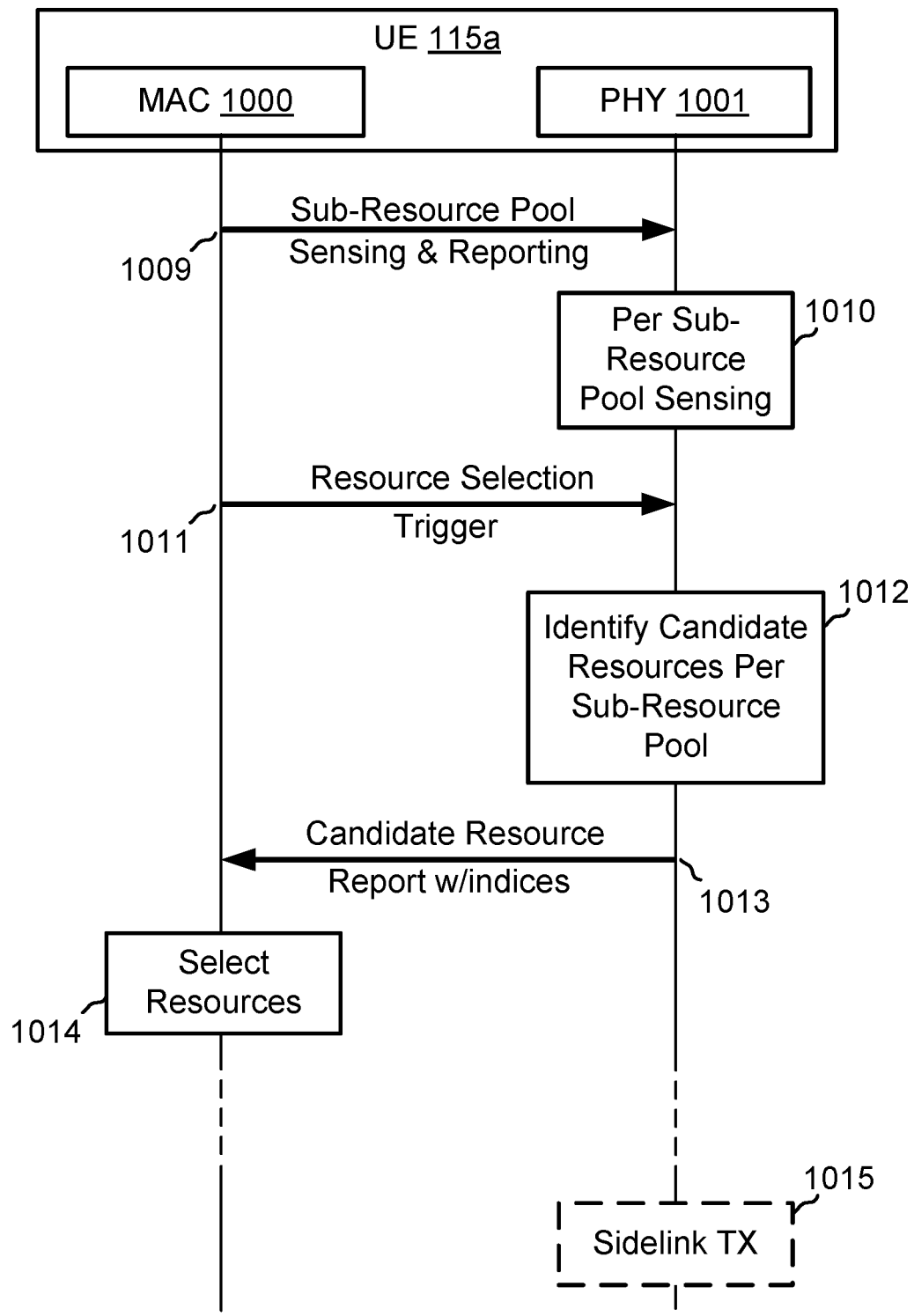

FIG. 10B is a communication flow diagram of communications between a MAC layer 1000 and a PHY layer 1001 of UE 115a configured to support sub-resource pools for transmission over unlicensed bands according to one or more aspects of the present disclosure. For an NR SL UE, such as UE 115a, its MAC layer 1000 can request its PHY layer 1001 to sense using the channel access type-aware configuration for sensing the sub-resource-pools. At 1009, MAC layer 1000 communicates the request to PHY layer 1001 to perform sensing using the sensing configurations for the one or more sub-resource pools identified according to channel access type of each resource of the transmission resource pool allocated with the resource selection window. At 1010, PHY layer 1001 uses the per sub-resource pool configuration to perform sensing at the sensing window of potentially available resources of the resource selection window. At 1011, the resource selection trigger prompts MAC layer 1000 to trigger PHY layer 1001 to identify candidate resources at 1012 over the identified sub-resource pools. PHY layer 1001 may then report the identified candidate resources identified using the per sub-resource pool sensing along with the indices that identify which sub-resource pool the identified candidate resource is located at 1013. With sub-resource-pool indices, MAC layer 1000 can conduct COT-aware resource selection, at 1014, according to one or more of the aspects described here and perform a sidelink transmission at 1015.

It should be noted that additional aspects where MAC layer 1000 requests PHY layer 1001 to sense using the sensing configuration for the sub-resource pools, MAC layer 1000 may identify sub-resource pools to exclude from the sensing of PHY layer 1001. For example, if UE 115a has higher priority sidelink data, MAC layer 1000 may signal to PHY layer 1001 to exclude any sub-resource pool that is identified for use with a channel access type that may delay transmission of the data. Similarly, if the battery power level of UE 115a is below a threshold level, MAC layer 1000 may signal PHY layer to exclude sensing any sub-resource pool that may use a channel access type that would cause UE 115a to expend additional processing power.

It should further be noted that, in order to save time, the sensing requests towards respective sub-resource pools can be issued once, and the reports can be collected once.

Figure 11:
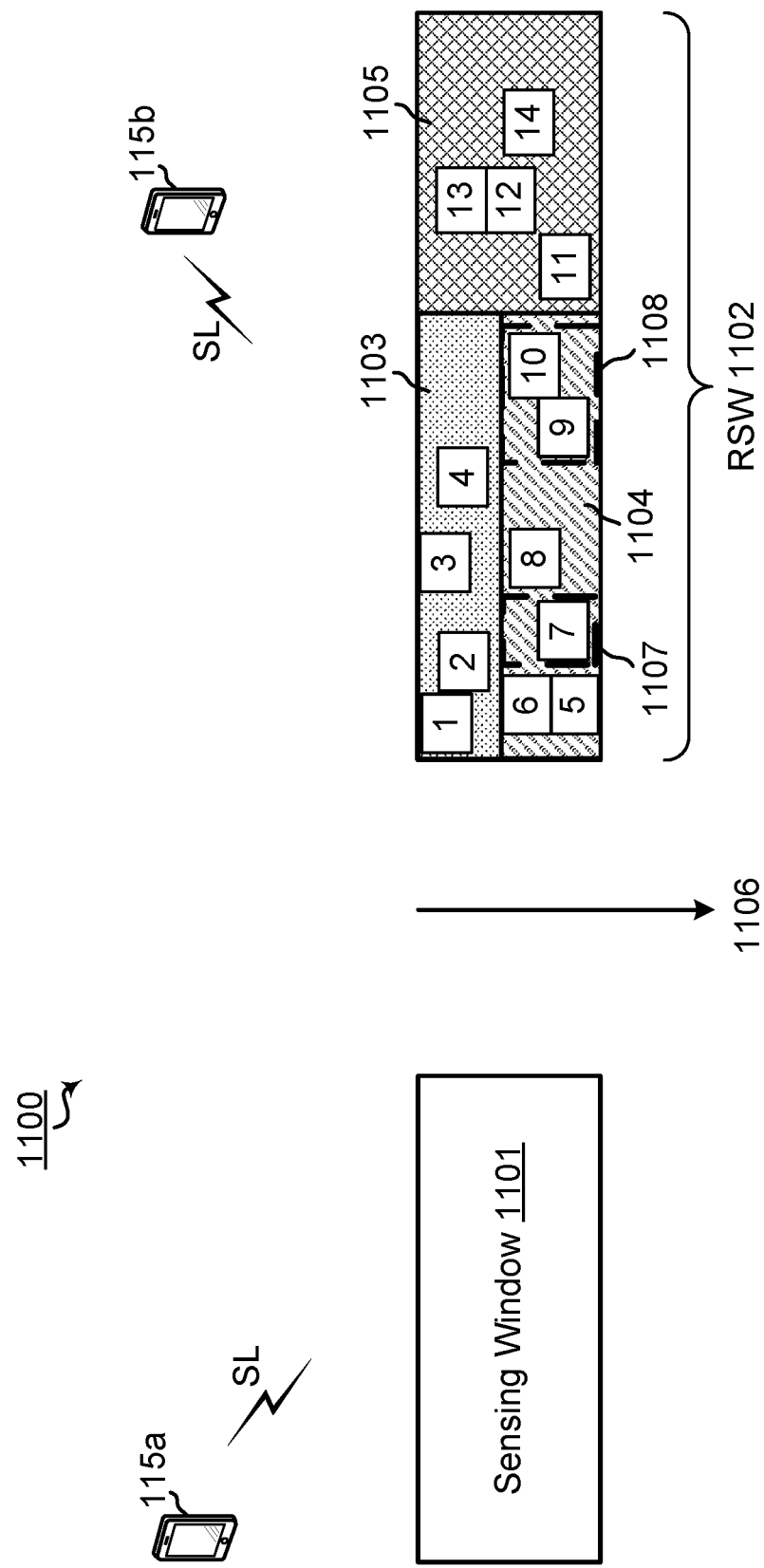
FIG. 11 is a block diagram illustrating an example wireless communications system that supports sub-resource pools for transmission of NR SL transmissions over unlicensed bands according to one or more aspects of the present disclosure.

FIG. 11 is a block diagram illustrating an example wireless communications system 1100 that supports sub-resource pools for transmission of NR SL transmissions over unlicensed bands according to one or more aspects of the present disclosure. An NR SL UE, such as UE 115a, may be configured to apply different resource selection algorithms on different sub-resource pools. With the sub-resource pool configuration from the network, UE 115a may identify the resources of the transmission resource pool of resource selection window 1102 into sub-resource pools 1103, 1104, and 1105, based on the channel access types of those resources. The different channel access types may be due to a COT-sharing occasion based on a COT secured by UE 115b (not shown). UE 115a may further identify a different resource selection algorithm between sub-resource pools 1103-1105. For example, in one example implementation, the resource selection algorithm of sub-resource pool 1103 may be defined as a random selection process. The resource selection algorithm of sub-resource pool 1104 may be based on an effective contention window (ECW) resource selection using ECW 1107 for initial transmission and ECW 1108 for a first re-transmission opportunity. The resource selection algorithm of sub-resource pool 1105 may be based on an earliest reported resource process. In an alternative example implementation, the resource selection algorithm for sub-resource pools 1103 and 1105 is the random selection process, while the resource selection algorithm of sub-resource pool 1104 is the ECW-based resource selection. According to the illustrated aspects, UE 115a may identify a different resource selection algorithm for each identified sub-resource pool.

The ECW-based resource selection may be implemented to overcome limitations with the CBR-based mechanism. When operating in a licensed band with Mode 2 based autonomous channel access, NR SL operations may rely on the CBR-based mechanism for congestion/contention control, as noted above. Thus, each NR SL UE, such as UEs 115a and 115b, measures CBR and then uses pre-configured mapping from the CBR to a CR limit in order to self-regulate channel access attempts to avoid heavy congestion/contention to the resources. The presence of interference from other RATs may result in erroneous CBR estimates. A sub-channel can be detected as "busy" in the CBR estimate when it is, in fact, occupied by other RAT(s). Consequently, the legacy CBR-based congestion control may break down. If a NR SL UE reacts to an erroneous CBR estimate, it can be starved by other RATs. Moreover, the robustness/usefulness of the CBR-based congestion control may frequently be challenged due to the strong inter-sub-channel leakage, especially for low-complexity receiver implementations.

Other RATs, such as WiFi, LTE-LAA, and NR-U, operating in the 5 GHz band typically adopt load-based equipment (LBE) channel access which uses a Type-1 LBT contention management scheme. After observing lost packets as a possible symptom of congestion, an LBE node doubles its contention window (CW) to reduce channel access contention. As a node in a synchronous system, however, a NR SL UE, such as UEs 115a and 115b, may not be able to fully operate like an LBE node nor solely rely on an LBE CW control for contention/congestion management. An LBE node may operate a floating ending-point LBT, while an NR SL UE would be configured to operated using a fixed ending-point LBT. The adaptive LBE CW adjustment may be defined for unicast, while groupcast/broadcast may be more likely for SL transmissions. Accordingly, the concept of ECW-based selection may improve the robustness of NR SL Mode 2 operation, especially in the 5 GHz unlicensed band.

Figure 12:
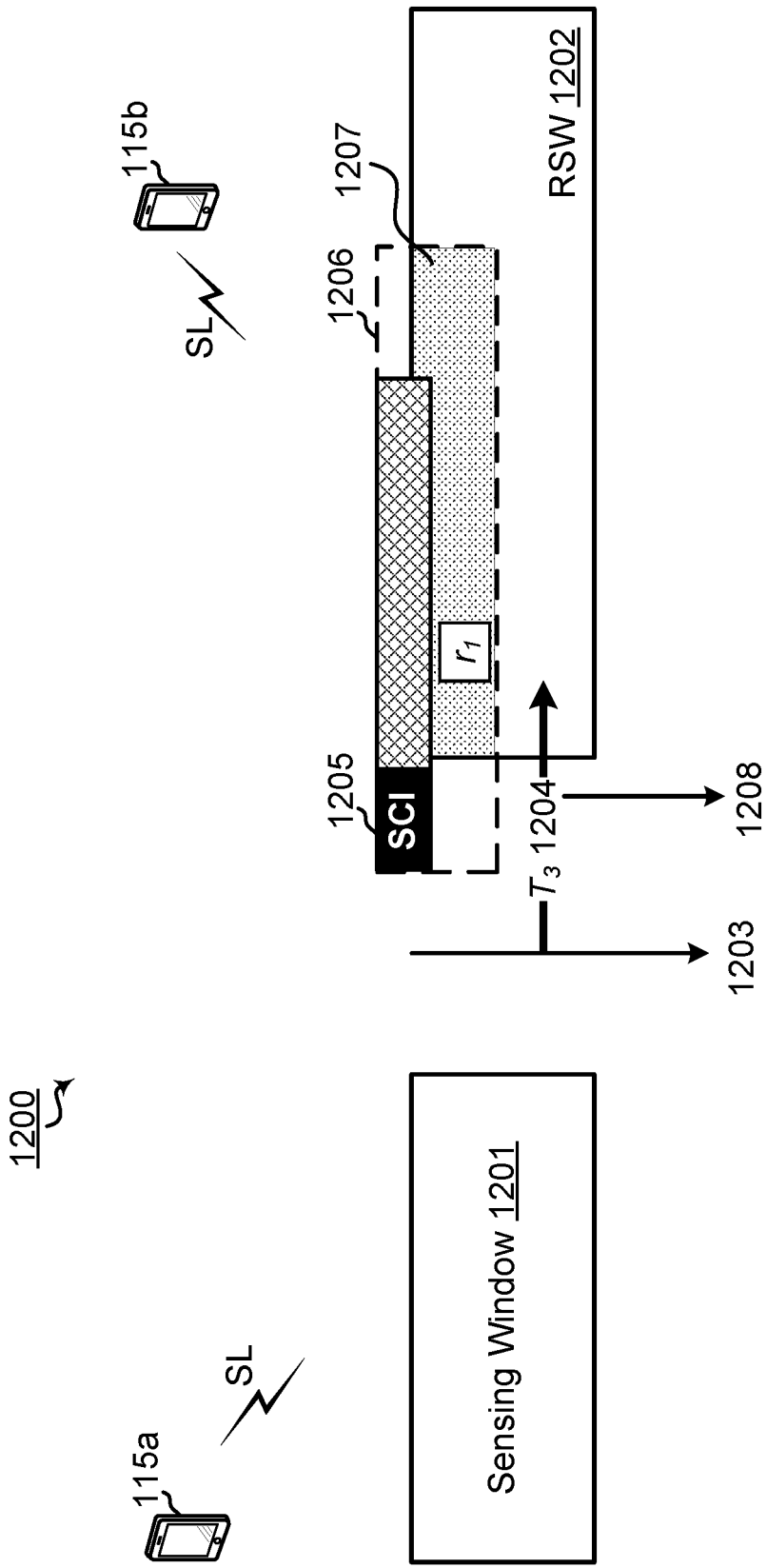
FIG. 12 is a block diagram illustrating an example wireless communications system that supports sub-resource pools for transmission of NR SL transmissions over unlicensed bands according to one or more aspects of the present disclosure.

FIG. 12 is a block diagram illustrating an example wireless communications system 1200 that supports sub-resource pools for transmission of NR SL transmissions over unlicensed bands according to one or more aspects of the present disclosure. An NR SL UE, such as UE 115a may obtain data for sidelink communication and prepare for autonomous access of the shared communication spectrum for sidelink transmission. UE 115a has received sidelink transmission configuration which defines sensing window 1201, during which the MAC layer of UE 115a requests the PHY layer to sense the available resources within a transmission resource pool of resource selection window 1202, which is also configured via the sidelink transmission configuration. At 1203, a resource selection trigger prompts UE 115a to select a transmission resource, $r_1$, within the transmission resource pool of resource selection window 1202. At that point, the MAC layer of UE 115a requests the PHY layer to perform re-evaluation sensing 1204 for a time, $T_3$, to re-evaluate the selection of $r_1$ before actually transmitting the data at $r_1$.

In legacy sidelink operations, the MAC layer of UE 115a uses the $T_3$ re-evaluation sensing 1204 to request the PHY layer of UE 115a to confirm whether the selected resource $r_1$ is still available. If $r_1$ is not available, the PHY layer will set a re-selection flag which triggers the MAC of UE 115a to re-select a new resource for sidelink transmission. Otherwise, UE 115a will use $r_1$ to transmit the sidelink data. According to the illustrated aspects of the present disclosure, during $T_3$ re-evaluation sensing 1204, UE 115a detects SCI 1205 from UE 115b that includes a COT-SI that defines COT 1206. As a part of the sidelink transmission configuration, UE 115a also receives configuration for identifying sub-resource pools according to channel access type. UE 115a may then use the sub-resource pool configuration to identify sub-resource pool 1207, which includes resources within a COT-sharing region of COT 1206. The sub-resource pool configuration further allows UE 115a to identify sub-resource pool 1207 to use a relaxed channel access type. Thus, in response to $T_3$ re-evaluation sensing 1204 sensing that $r_1$ is now within sub-resource pool 1207, which may be accessed using a different access method than when the MAC layer of UE 115a initially selected rot the resource selection trigger at 1203, the PHY layer of UE 115a may send a sub-resource-pool update flag to indicate to the MAC layer that the selected resource $r_1$ now is in a different sub-resource-pool. It may be beneficial for the PHY layer of UE 115a to inform the MAC layer during $T_3$ re-evaluation sensing 1204 if this change in sub-resource-pool index has happened, so that UE 115a may attempt access of $r_1$ using the more beneficial channel access type.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like.

A first aspect of wireless communication performed by a UE includes receiving, by the UE, a sidelink configuration message from a serving base station, wherein the sidelink configuration message includes identification of a plurality of channel access types associated with a plurality of sub-resource pools for autonomous sidelink access of a shared communication channel; obtaining, by the UE, information for a sidelink transmission over a transmission resource pool allocated for the autonomous sidelink access; determining, by the UE, the plurality of sub-resource pools from a plurality of available resources within the transmission resource pool according to a channel access type of each resource of the plurality of available resources, wherein each sub-resource pool of the plurality of sub-resource pools includes a subset of resources of the plurality of available resources associated with a corresponding channel access type; selecting, by the UE, a sub-resource pool of the plurality of sub-resource pools for sidelink transmission; and transmitting, by the UE, the information on a transmission resource selected from the sub-resource pool via the sideline transmission in response to successful access of the transmission resource according to the channel access type associated with the sub-resource pool.

In a second aspect, alone or in combination with the first aspect, further including: detecting, by the UE, configuration of a COT-sharing occasion overlapping the transmission resource pool; and determining, by the UE, the channel access type according to a location of each resource of the transmission resource pool relative to the COT-sharing occasion.

In a third aspect, alone or in combination with one or more of the first and second aspects, wherein the determining the channel access type includes: determining at least one COT-sharing channel access type for each resource of the transmission resource pool located within the overlapping COT-sharing occasion, wherein at least one sub-resource pool of the plurality of sub-resource pools is defined according to the at least one COT-sharing channel access type; and determining a pool channel access type for each resource of the transmission resource pool located outside of the overlapping COT-sharing occasion, wherein one sub-resource pool of the plurality of sub-resource pools is defined according to the pool channel access type.

In a fourth aspect, alone or in combination with one or more of the first aspect through the third aspect, wherein the selecting the sub-resource pool includes: determining a congestion control limitation associated with one of: the transmission resource pool or the transmission resource pool and the sub-resource pool, wherein the transmitting is further in response to the UE satisfying the congestion control limitation.

In a fifth aspect, alone or in combination with one or more of the first aspect through the fourth aspect, wherein the congestion control limitation associated with the transmission resource pool and each sub-resource pool of the plurality of sub-resource pools is different.

In a sixth aspect, alone or in combination with one or more of the first aspect through the fifth aspect, wherein the congestion control limitation includes one of: a relationship between a CBR and a CR; or a virtual collision-based congestion control.

In a seventh aspect, alone or in combination with one or more of the first aspect through the sixth aspect, further including: calculating, by the UE, a congestion control metric associated with one or more of the plurality of sub-resource pools and the transmission resource pool; and reporting, by the UE, the congestion control metric to a serving base station.

In an eighth aspect, alone or in combination with one or more of the first aspect through the seventh aspect, wherein the reporting is one of: periodically or in response to a report trigger event.

In a ninth aspect, alone or in combination with one or more of the first aspect through the eighth aspect, wherein a CR limit for the determining the congestion control limitation associated with the relationship between the CBR and the CR is one of: a function of the sub-resource pool or a function of both of the sub-resource pool and the transmission resource pool.

In a tenth aspect, alone or in combination with one or more of the first aspect through the ninth aspect, further including: generating, by the UE, an intermediate CBR for the determining the congestion control limitation associated with the relationship between the CBR and the CR for each sensing instance of the UE, wherein the generating is initiated by a trigger condition including one of: a resource selection trigger based on arrival of a new data packet, a re-evaluation sensing period after selection of a preliminary transmission resource, or a CBR estimation signal received by the UE one of periodically or event-driven.

In an eleventh aspect, alone or in combination with one or more of the first aspect through the tenth aspect, wherein the intermediate CBR includes a total number of available sub-channels of each sensing instance and a total number of occupied sub-channels of the total number of available sub-channels sensed during each sensing instance.

In a twelfth aspect, alone or in combination with one or more of the first aspect through the eleventh aspect, further including: receiving, by the UE, a configuration message configuring the UE to calculate the intermediate CBR using the total number of occupied sub-channels detected using one of a SCI or a RSRP.

In a thirteenth aspect, alone or in combination with one or more of the first aspect through the twelfth aspect, further including: generating, by the UE, an intermediate congestion metric for the determining the congestion control limitation associated with the relationship between the CBR and the CR for each sensing instance of the UE, wherein the generating includes: calculating a pool-specific congestion metric over a calculation window for each of the plurality of sub-resource pools and the transmission resource pool, wherein the calculation window for each of the plurality of sub-resource pools is different from the calculation window for the transmission resource pool, and wherein the calculation window for each of the plurality of sub-resource pools is different; and accumulating the pool-specific congestion metric from the calculating into the intermediate congestion metric, wherein the intermediate congestion metric includes one of a CBR or a CR.

In a fourteenth aspect, alone or in combination with one or more of the first aspect through the thirteenth aspect, further including: generating, by the UE, an intermediate CR for the determining the congestion control limitation associated with the relationship between the CBR and the CR for each sensing instance of the UE, wherein the generating is initiated by a trigger condition including one of: a resource selection trigger based on arrival of a new data packet, a re-evaluation sensing period after selection of a preliminary transmission resource, or a CR estimation signal received by the UE one of periodically or event-driven.

In a fifteenth aspect, alone or in combination with one or more of the first aspect through the fourteenth aspect, wherein the intermediate CR includes a total number of available sub-channels of each sensing instance, and wherein a total CR for the determining the congestion control limitation associated with the relationship between the CBR and the CR is determined by accumulation of each of the intermediate CR generated for each sensing instance of the UE.

In a sixteenth aspect, alone or in combination with one or more of the first aspect through the fifteenth aspect, wherein the selecting the sub-resource pool includes: identifying an admission control limitation associated with the sub-resource pool, wherein the admission control limitation includes one of: a high priority data limitation; a packet delay budget threshold; or a battery power threshold; and determining whether a condition of the UE satisfies the admission control limitation, wherein a successful condition includes one of: the information for the sidelink transmission includes high priority data that meets the high priority data limitation; a currently packet delay budget for the information below the packet delay budget threshold; or a current battery power level at the UE below the battery power threshold, wherein the transmitting the information on the transmission resource of the sub-resource pool is in response to the successful condition.

In a seventeenth aspect, alone or in combination with one or more of the first aspect through the sixteenth aspect, further including: selecting a next sub-resource pool of the plurality of sub-resource pools associated with a next desired channel access type in response to a failure to determine the successful condition; identifying the admission control limitation associated with the next desired channel access type; and determining whether the condition of the UE satisfies the admission control limitation of the next sub-resource pool.

In an eighteenth aspect, alone or in combination with one or more of the first aspect through the seventeenth aspect, wherein the selecting the sub-resource pool includes: requesting, by a MAC layer of the UE to a PHY layer of the UE, to sense for available resources from the transmission resource pool according to a sensing set-up for the transmission resource pool, and report the available resources with sub-resource pool indices corresponding to an available sub-resource pool of the plurality of sub-resource pools in which the available resources are located; and performing sub-resource pool-aware selection of the transmission resource using the sub-resource pool indices.

In a nineteenth aspect, alone or in combination with one or more of the first aspect through the eighteenth aspect, wherein the selecting the sub-resource pool includes: requesting, by a MAC layer of the UE to a PHY layer of the UE, to: sense for available resources from the plurality of sub-resource pools and the transmission resource pool according to a sub-resource pool-specific sensing set-up for the plurality of sub-resource pools and according to a sensing set-up for the transmission resource pool, and report the available resources with sub-resource pool indices corresponding to an available sub-resource pool of the plurality of sub-resource pools in which the available resources are located; and performing sub-resource pool-aware selection of the transmission resource using the sub-resource pool indices.

In a twentieth aspect, alone or in combination with one or more of the first aspect through the nineteenth aspect, wherein the requesting to sense for the available resources includes: determining the UE fails to meet one or more admission control criteria associated with one or more sub-resource pools of the plurality of sub-resource pools; and requesting to sense for the available resources from the plurality of sub-resource pools excluding the one or more sub-resource pools and the transmission resource pool according to a sub-resource pool-specific sensing set-up for the plurality of sub-resource pools and according to a sensing set-up for the transmission resource pool.

In a twenty-first aspect, alone or in combination with one or more of the first aspect through the twentieth aspect, wherein the transmission resource is selected according to a resource selection procedure associated with the sub-resource pool, wherein the resource selection procedure associated with each sub-resource pool of the plurality of sub-resource pools is different and wherein the resource selection procedure with each sub-resource pool of the plurality of sub-resource pools is one of different or same as the resource selection procedure associated with the transmission resource pool.

In a twenty-second aspect, alone or in combination with one or more of the first aspect through the twenty-first aspect, wherein the resource selection procedure includes one of: a random selection procedure; a predetermined selection sequence procedure; or an effective contention window selection procedure.

In a twenty-third aspect, alone or in combination with one or more of the first aspect through the twenty-second aspect, further including: selecting, by the UE, an initial transmission resource at a resource selection trigger, wherein the initial transmission resource is selected from an initial sub-resource pool of the plurality of sub-resource pools; initiating, by the UE, re-evaluation sensing of the plurality of available resources in response to the selecting; signaling, by a PHY layer of the UE to the MAC layer of the UE, a sub-resource pool update message in response to the initiating, wherein the sub-resource pool update message indicates whether the initial transmission resource one of remains within the initial sub-resource pool or is located within a new sub-resource pool of the plurality of sub-resource pools.

A twenty-fourth aspect configured for wireless communication by a UE includes at least one processor; and a memory coupled to the at least one processor, wherein the at least one processor is configured: to receiving, by the UE, a sidelink configuration message from a serving base station, wherein the sidelink configuration message includes identification of a plurality of channel access types associated with a plurality of sub-resource pools for autonomous sidelink access of a shared communication channel; to obtain, by the UE, information for a sidelink transmission over a transmission resource pool allocated for the autonomous sidelink access; to determine, by the UE, the plurality of sub-resource pools from a plurality of available resources within the transmission resource pool according to a channel access type of each resource of the plurality of available resources, wherein each sub-resource pool of the plurality of sub-resource pools includes a subset of resources of the plurality of available resources associated with a corresponding channel access type; to select, by the UE, a sub-resource pool of the plurality of sub-resource pools for sidelink transmission; and to transmit, by the UE, the information on a transmission resource selected from the sub-resource pool via the sideline transmission in response to successful access of the transmission resource according to the channel access type associated with the sub-resource pool.

In a twenty-fifth aspect, alone or in combination with the twenty-fourth aspect, further including configuration of the at least one processor: to detect, by the UE, configuration of a COT-sharing occasion overlapping the transmission resource pool; and to determine, by the UE, the channel access type according to a location of each resource of the transmission resource pool relative to the COT-sharing occasion.

In a twenty-sixth aspect, alone or in combination with one or more of the twenty-fourth and twenty-fifth aspects, wherein the configuration of the at least one processor to determine the channel access type includes configuration of the at least one processor: to determine at least one COT-sharing channel access type for each resource of the transmission resource pool located within the overlapping COT-sharing occasion, wherein at least one sub-resource pool of the plurality of sub-resource pools is defined according to the at least one COT-sharing channel access type; and to determine a pool channel access type for each resource of the transmission resource pool located outside of the overlapping COT-sharing occasion, wherein one sub-resource pool of the plurality of sub-resource pools is defined according to the pool channel access type.

In a twenty-seventh aspect, alone or in combination with one or more of the twenty-fourth aspect through the twenty-sixth aspect, wherein the configuration of the at least one processor to select the sub-resource pool includes configuration of the at least one processor: to determine a congestion control limitation associated with one of: the transmission resource pool or the transmission resource pool and the sub-resource pool, wherein the configuration of the at least one processor to transmit is executed further in response to the UE satisfying the congestion control limitation.

In a twenty-eighth aspect, alone or in combination with one or more of the twenty-fourth aspect through the twenty-seventh aspect, wherein the congestion control limitation associated with the transmission resource pool and each sub-resource pool of the plurality of sub-resource pools is different.

In a twenty-ninth aspect, alone or in combination with one or more of the twenty-fourth aspect through the twenty-eighth aspect, wherein the congestion control limitation includes one of: a relationship between a CBR and a CR; or a virtual collision-based congestion control.

In a thirtieth aspect, alone or in combination with one or more of the twenty-fourth aspect through the twenty-ninth aspect, further including configuration of the at least one processor: to calculate, by the UE, a congestion control metric associated with one or more of the plurality of sub-resource pools and the transmission resource pool; and to report, by the UE, the congestion control metric to a serving base station.

In a thirty-first aspect, alone or in combination with one or more of the twenty-fourth aspect through the thirtieth aspect, wherein the configuration of the at least one processor to report is executed one of: periodically or in response to a report trigger event.

In a thirty-second aspect, alone or in combination with one or more of the twenty-fourth aspect through the thirty-first aspect, wherein a CR limit for the configuration of the at least one processor to determine the congestion control limitation associated with the relationship between the CBR and the CR is one of: a function of the sub-resource pool or a function of both of the sub-resource pool and the transmission resource pool.

In a thirty-third aspect, alone or in combination with one or more of the twenty-fourth aspect through the thirty-second aspect, further including configuration of the at least one processor: to generate, by the UE, an intermediate CBR for the configuration of the at least one processor to determine the congestion control limitation associated with the relationship between the CBR and the CR for each sensing instance of the UE, wherein the configuration of the at least one processor to generate is initiated by a trigger condition including one of: a resource selection trigger based on arrival of a new data packet, a re-evaluation sensing period after selection of a preliminary transmission resource, or a CBR estimation signal received by the UE one of periodically or event-driven.

In a thirty-fourth aspect, alone or in combination with one or more of the twenty-fourth aspect through the thirty-third aspect, wherein the intermediate CBR includes a total number of available sub-channels of each sensing instance and a total number of occupied sub-channels of the total number of available sub-channels sensed during each sensing instance.

In a thirty-fifth aspect, alone or in combination with one or more of the twenty-fourth aspect through the thirty-fourth aspect, further including configuration of the at least one processor: to receive, by the UE, a configuration message configuring the UE to calculate the intermediate CBR using the total number of occupied sub-channels detected using one of a SCI or a RSRP.

In a thirty-sixth aspect, alone or in combination with one or more of the twenty-fourth aspect through the thirty-fifth aspect, further including configuration of the at least one processor: to generate, by the UE, an intermediate congestion metric for the configuration of the at least one processor to determine the congestion control limitation associated with the relationship between the CBR and the CR for each sensing instance of the UE, wherein the configuration of the at least one processor to generate includes configuration of the at least one processor: to calculate a pool-specific congestion metric over a calculation window for each of the plurality of sub-resource pools and the transmission resource pool, wherein the calculation window for each of the plurality of sub-resource pools is different from the calculation window for the transmission resource pool, and wherein the calculation window for each of the plurality of sub-resource pools is different; and to accumulate the pool-specific congestion metric from the configuration of the at least one processor to calculate into the intermediate congestion metric, wherein the intermediate congestion metric includes one of a CBR or a CR.

In a thirty-seventh aspect, alone or in combination with one or more of the twenty-fourth aspect through the thirty-sixth aspect, further including configuration of the at least one processor: to generate, by the UE, an intermediate CR for the configuration of the at least one processor to determine the congestion control limitation associated with the relationship between the CBR and the CR for each sensing instance of the UE, wherein the configuration of the at least one processor to generate is initiated by a trigger condition including one of: a resource selection trigger based on arrival of a new data packet, a re-evaluation sensing period after selection of a preliminary transmission resource, or a CR estimation signal received by the UE one of periodically or event-driven.

In a thirty-eighth aspect, alone or in combination with one or more of the twenty-fourth aspect through the thirty-seventh aspect, wherein the intermediate CR includes a total number of available sub-channels of each sensing instance, and wherein a total CR for the configuration of the at least one processor to determine the congestion control limitation associated with the relationship between the CBR and the CR is determined by accumulation of each of the intermediate CR generated for each sensing instance of the UE.

In a thirty-ninth aspect, alone or in combination with one or more of the twenty-fourth aspect through the thirty-eighth aspect, wherein the configuration of the at least one processor select the sub-resource pool includes configuration of the at least one processor: to identify an admission control limitation associated with the sub-resource pool, wherein the admission control limitation includes one of: a high priority data limitation; a packet delay budget threshold; or a battery power threshold; and to determine whether a condition of the UE satisfies the admission control limitation, wherein a successful condition includes one of: the information for the sidelink transmission includes high priority data that meets the high priority data limitation; a currently packet delay budget for the information below the packet delay budget threshold; or a current battery power level at the UE below the battery power threshold, wherein the configuration of the at least one processor to transmit the information on the transmission resource of the sub-resource pool is in response to the successful condition.

In a fortieth aspect, alone or in combination with one or more of the twenty-fourth aspect through the thirty-ninth aspect, further including configuration of the at least one processor: to select a next sub-resource pool of the plurality of sub-resource pools associated with a next desired channel access type in response to a failure to determine the successful condition; to identify the admission control limitation associated with the next desired channel access type;

and to determine whether the condition of the UE satisfies the admission control limitation of the next sub-resource pool.

In a forty-first aspect, alone or in combination with one or more of the twenty-fourth aspect through the fortieth aspect, wherein the configuration of the at least one processor to select the sub-resource pool includes configuration of the at least one processor: to request, by a MAC layer of the UE to a PHY layer of the UE, to sense for available resources from the transmission resource pool according to a sensing set-up for the transmission resource pool, and report the available resources with sub-resource pool indices corresponding to an available sub-resource pool of the plurality of sub-resource pools in which the available resources are located; and to perform sub-resource pool-aware selection of the transmission resource using the sub-resource pool indices.

In a forty-second aspect, alone or in combination with one or more of the twenty-fourth aspect through the forty-first aspect, wherein the configuration of the at least one processor to select the sub-resource pool includes configuration of the at least one processor: to request, by a MAC layer of the UE to a PHY layer of the UE, to: sense for available resources from the plurality of sub-resource pools and the transmission resource pool according to a sub-resource pool-specific sensing set-up for the plurality of sub-resource pools and according to a sensing set-up for the transmission resource pool, and report the available resources with sub-resource pool indices corresponding to an available sub-resource pool of the plurality of sub-resource pools in which the available resources are located; and to perform sub-resource pool-aware selection of the transmission resource using the sub-resource pool indices.

In a forty-third aspect, alone or in combination with one or more of the twenty-fourth aspect through the forty-second aspect, wherein the configuration of the at least one processor to request to sense for the available resources includes configuration of the at least one processor: to determine the UE fails to meet one or more admission control criteria associated with one or more sub-resource pools of the plurality of sub-resource pools; and to request to sense for the available resources from the plurality of sub-resource pools excluding the one or more sub-resource pools and the transmission resource pool according to a sub-resource pool-specific sensing set-up for the plurality of sub-resource pools and according to a sensing set-up for the transmission resource pool.

In a forty-fourth aspect, alone or in combination with one or more of the twenty-fourth aspect through the forty-third aspect, wherein the transmission resource is selected according to a resource selection procedure associated with the sub-resource pool, wherein the resource selection procedure associated with each sub-resource pool of the plurality of sub-resource pools is different and wherein the resource selection procedure with each sub-resource pool of the plurality of sub-resource pools is one of different or same as the resource selection procedure associated with the transmission resource pool.

In a forty-fifth aspect, alone or in combination with one or more of the twenty-fourth aspect through the forty-fourth aspect, wherein the resource selection procedure includes one of: a random selection procedure; a predetermined selection sequence procedure; or an effective contention window selection procedure.

In a forty-sixth aspect, alone or in combination with one or more of the twenty-fourth aspect through the forty-fifth aspect, further including configuration of the at least one processor: to select, by the UE, an initial transmission resource at a resource selection trigger, wherein the initial transmission resource is selected from an initial sub-resource pool of the plurality of sub-resource pools; to initiate, by the UE, re-evaluation sensing of the plurality of available resources in response to the configuration of the at least one processor to select; to signal, by a PHY layer of the UE to the MAC layer of the UE, a sub-resource pool update message in response to the initiating, wherein the sub-resource pool update message indicates whether the initial transmission resource one of remains within the initial sub-resource pool or is located within a new sub-resource pool of the plurality of sub-resource pools.

A forty-seventh aspect configured for wireless communication by a UE includes means for receiving, by the UE, a sidelink configuration message from a serving base station, wherein the sidelink configuration message includes identification of a plurality of channel access types associated with a plurality of sub-resource pools for autonomous sidelink access of a shared communication channel; means for obtaining, by the UE, information for a sidelink transmission over a transmission resource pool allocated for the autonomous sidelink access; means for determining, by the UE, the plurality of sub-resource pools from a plurality of available resources within the transmission resource pool according to a channel access type of each resource of the plurality of available resources, wherein each sub-resource pool of the plurality of sub-resource pools includes a subset of resources of the plurality of available resources associated with a corresponding channel access type; means for selecting, by the UE, a sub-resource pool of the plurality of sub-resource pools for sidelink transmission; and means for transmitting, by the UE, the information on a transmission resource selected from the sub-resource pool via the sideline transmission in response to successful access of the transmission resource according to the channel access type associated with the sub-resource pool.

In a forty-eighth aspect, alone or in combination with the forty-seventh aspect, further including: means for detecting, by the UE, configuration of a COT-sharing occasion overlapping the transmission resource pool; and means for determining, by the UE, the channel access type according to a location of each resource of the transmission resource pool relative to the COT-sharing occasion.

In a forty-ninth aspect, alone or in combination with one or more of the forty-seventh and the forty eighth aspects, wherein the means for determining the channel access type includes: means for determining at least one COT-sharing channel access type for each resource of the transmission resource pool located within the overlapping COT-sharing occasion, wherein at least one sub-resource pool of the plurality of sub-resource pools is defined according to the at least one COT-sharing channel access type; and means for determining a pool channel access type for each resource of the transmission resource pool located outside of the overlapping COT-sharing occasion, wherein one sub-resource pool of the plurality of sub-resource pools is defined according to the pool channel access type.

In a fiftieth aspect, alone or in combination with one or more of the forty-seventh aspect through the forty-ninth aspect, wherein the means for selecting the sub-resource pool includes: means for determining a congestion control limitation associated with one of: the transmission resource pool or the transmission resource pool and the sub-resource pool, wherein the means for transmitting is executed further in response to the UE satisfying the congestion control limitation.

In a fifty-first aspect, alone or in combination with one or more of the forty-seventh aspect through the fiftieth aspect, wherein the congestion control limitation associated with the transmission resource pool and each sub-resource pool of the plurality of sub-resource pools is different.

In a fifty-second aspect, alone or in combination with one or more of the forty-seventh aspect through the fifty-first aspect, wherein the congestion control limitation includes one of: a relationship between a CBR and a CR; or a virtual collision-based congestion control.

In a fifty-third aspect, alone or in combination with one or more of the forty-seventh aspect through the fifty-second aspect, further including: means for calculating, by the UE, a congestion control metric associated with one or more of the plurality of sub-resource pools and the transmission resource pool; and means for reporting, by the UE, the congestion control metric to a serving base station.

In a fifty-fourth aspect, alone or in combination with one or more of the forty-seventh aspect through the fifty-third aspect, wherein the means for reporting is executed one of: periodically or in response to a report trigger event.

In a fifty-fifth aspect, alone or in combination with one or more of the forty-seventh aspect through the fifty-fourth aspect, wherein a CR limit for the means for determining the congestion control limitation associated with the relationship between the CBR and the CR is one of: a function of the sub-resource pool or a function of both of the sub-resource pool and the transmission resource pool.

In a fifty-sixth aspect, alone or in combination with one or more of the forty-seventh aspect through the fifty-fifth aspect, further including: means for generating, by the UE, an intermediate CBR for the determining the congestion control limitation associated with the relationship between the CBR and the CR for each sensing instance of the UE, wherein the means for generating is initiated by a trigger condition including one of: a resource selection trigger based on arrival of a new data packet, a re-evaluation sensing period after selection of a preliminary transmission resource, or a CBR estimation signal received by the UE one of periodically or event-driven.

In a fifty-seventh aspect, alone or in combination with one or more of the forty-seventh aspect through the fifty-sixth aspect, wherein the intermediate CBR includes a total number of available sub-channels of each sensing instance and a total number of occupied sub-channels of the total number of available sub-channels sensed during each sensing instance.

In a fifty-eighth aspect, alone or in combination with one or more of the forty-seventh aspect through the fifty seventh aspect, further including: means for receiving, by the UE, a configuration message configuring the UE to calculate the intermediate CBR using the total number of occupied sub-channels detected using one of a SCI or a RSRP.

In a fifty-ninth aspect, alone or in combination with one or more of the forty-seventh aspect through the fifty-eighth aspect, further including: means for generating, by the UE, an intermediate congestion metric for the means for determining the congestion control limitation associated with the relationship between the CBR and the CR for each sensing instance of the UE, wherein the means for generating includes: means for calculating a pool-specific congestion metric over a calculation window for each of the plurality of sub-resource pools and the transmission resource pool, wherein the calculation window for each of the plurality of sub-resource pools is different from the calculation window for the transmission resource pool, and wherein the calculation window for each of the plurality of sub-resource pools is different; and means for accumulating the pool-specific congestion metric from the means for calculating into the intermediate congestion metric, wherein the intermediate congestion metric includes one of a CBR or a CR.

In a sixtieth aspect, alone or in combination with one or more of the forty-seventh aspect through the fifty-ninth aspect, further including: means for generating, by the UE, an intermediate CR for the means for determining the congestion control limitation associated with the relationship between the CBR and the CR for each sensing instance of the UE, wherein the means for generating is initiated by a trigger condition including one of: a resource selection trigger based on arrival of a new data packet, a re-evaluation sensing period after selection of a preliminary transmission resource, or a CR estimation signal received by the UE one of periodically or event-driven.

In a sixty-first aspect, alone or in combination with one or more of the forty-seventh aspect through the sixtieth aspect, wherein the intermediate CR includes a total number of available sub-channels of each sensing instance, and wherein a total CR for the determining the congestion control limitation associated with the relationship between the CBR and the CR is determined by accumulation of each of the intermediate CR generated for each sensing instance of the UE.

In a sixty-second aspect, alone or in combination with one or more of the forty-seventh aspect through the sixty-first aspect, wherein the means for selecting the sub-resource pool includes: means for identifying an admission control limitation associated with the sub-resource pool, wherein the admission control limitation includes one of: a high priority data limitation; a packet delay budget threshold; or a battery power threshold; and means for determining whether a condition of the UE satisfies the admission control limitation, wherein a successful condition includes one of: the information for the sidelink transmission includes high priority data that meets the high priority data limitation; a currently packet delay budget for the information below the packet delay budget threshold; or a current battery power level at the UE below the battery power threshold, wherein the means for transmitting the information on the transmission resource of the sub-resource pool is executed in response to the successful condition.

In a sixty-third aspect, alone or in combination with one or more of the forty-seventh aspect through the sixty-second aspect, further including: means for selecting a next sub-resource pool of the plurality of sub-resource pools associated with a next desired channel access type in response to a failure to determine the successful condition; means for identifying the admission control limitation associated with the next desired channel access type; and means for determining whether the condition of the UE satisfies the admission control limitation of the next sub-resource pool.

In a sixty-fourth aspect, alone or in combination with one or more of the forty-seventh aspect through the sixty-third aspect, wherein the means for selecting the sub-resource pool includes: means for requesting, by a MAC layer of the UE to a PHY layer of the UE, to sense for available resources from the transmission resource pool according to a sensing set-up for the transmission resource pool, and report the available resources with sub-resource pool indices corresponding to an available sub-resource pool of the plurality of sub-resource pools in which the available resources are located; and means for performing sub-resource pool-aware selection of the transmission resource using the sub-resource pool indices.

In a sixty-fifth aspect, alone or in combination with one or more of the forty-seventh aspect through the sixty-fourth aspect, wherein the means for selecting the sub-resource pool includes: means for requesting, by a MAC layer of the UE to a PHY layer of the UE, to: sense for available resources from the plurality of sub-resource pools and the transmission resource pool according to a sub-resource pool-specific sensing set-up for the plurality of sub-resource pools and according to a sensing set-up for the transmission resource pool, and report the available resources with sub-resource pool indices corresponding to an available sub-resource pool of the plurality of sub-resource pools in which the available resources are located; and means for performing sub-resource pool-aware selection of the transmission resource using the sub-resource pool indices.

In a sixty-sixth aspect, alone or in combination with one or more of the forty-seventh aspect through the sixty-fifth aspect, wherein the means for requesting to sense for the available resources includes: means for determining the UE fails to meet one or more admission control criteria associated with one or more sub-resource pools of the plurality of sub-resource pools; and means for requesting to sense for the available resources from the plurality of sub-resource pools excluding the one or more sub-resource pools and the transmission resource pool according to a sub-resource pool-specific sensing set-up for the plurality of sub-resource pools and according to a sensing set-up for the transmission resource pool.

In a sixty-seventh aspect, alone or in combination with one or more of the forty-seventh aspect through the sixty-sixth aspect, wherein the transmission resource is selected according to a resource selection procedure associated with the sub-resource pool, wherein the resource selection procedure associated with each sub-resource pool of the plurality of sub-resource pools is different and wherein the resource selection procedure with each sub-resource pool of the plurality of sub-resource pools is one of different or same as the resource selection procedure associated with the transmission resource pool.

In a sixty-eighth aspect, alone or in combination with one or more of the forty-seventh aspect through the sixty-seventh aspect, wherein the resource selection procedure includes one of: a random selection procedure; a predetermined selection sequence procedure; or an effective contention window selection procedure.

In a sixty-ninth aspect, alone or in combination with one or more of the forty-seventh aspect through the sixty-eighth aspect, further including: means for selecting, by the UE, an initial transmission resource at a resource selection trigger, wherein the initial transmission resource is selected from an initial sub-resource pool of the plurality of sub-resource pools; means for initiating, by the UE, re-evaluation sensing of the plurality of available resources in response to the means for selecting; means for signaling, by a PHY layer of the UE to the MAC layer of the UE, a sub-resource pool update message in response to the means for initiating, wherein the sub-resource pool update message indicates whether the initial transmission resource one of remains within the initial sub-resource pool or is located within a new sub-resource pool of the plurality of sub-resource pools.

A seventieth aspect configured for wireless communication by a UE includes a non-transitory computer-readable medium having program code recorded thereon. The program code includes program code executable by a computer for causing the computer to receive, by the UE, a sidelink configuration message from a serving base station, wherein the sidelink configuration message includes identification of a plurality of channel access types associated with a plurality of sub-resource pools for autonomous sidelink access of a shared communication channel; program code executable by the computer for causing the computer to obtain, by the UE, information for a sidelink transmission over a transmission resource pool allocated for the autonomous sidelink access; program code executable by the computer for causing the computer to determine, by the UE, the plurality of sub-resource pools from a plurality of available resources within the transmission resource pool according to a channel access type of each resource of the plurality of available resources, wherein each sub-resource pool of the plurality of sub-resource pools includes a subset of resources of the plurality of available resources associated with a corresponding channel access type; program code executable by the computer for causing the computer to select, by the UE, a sub-resource pool of the plurality of sub-resource pools for sidelink transmission; and program code executable by the computer for causing the computer to transmit, by the UE, the information on a transmission resource selected from the sub-resource pool via the sideline transmission in response to successful access of the transmission resource according to the channel access type associated with the sub-resource pool.

In a seventy-first aspect, alone or in combination with the seventieth aspect, further including program code executable by the computer for causing the computer: to detect, by the UE, configuration of a COT-sharing occasion overlapping the transmission resource pool; and to determine, by the UE, the channel access type according to a location of each resource of the transmission resource pool relative to the COT-sharing occasion.

In a seventy-second aspect, alone or in combination with one or more of the seventieth and seventy-first aspects, wherein the program code executable by the computer for causing the computer to determine the channel access type includes program code executable by the computer for causing the computer: to determine at least one COT-sharing channel access type for each resource of the transmission resource pool located within the overlapping COT-sharing occasion, wherein at least one sub-resource pool of the plurality of sub-resource pools is defined according to the at least one COT-sharing channel access type; and to determine a pool channel access type for each resource of the transmission resource pool located outside of the overlapping COT-sharing occasion, wherein one sub-resource pool of the plurality of sub-resource pools is defined according to the pool channel access type.

In a seventy-third aspect, alone or in combination with one or more of the seventieth aspect through the seventy-second aspect, wherein the program code executable by the computer for causing the computer to select the sub-resource pool includes configuration of the at least one processor: to determine a congestion control limitation associated with one of: the transmission resource pool or the transmission resource pool and the sub-resource pool, wherein the program code executable by the computer for causing the computer to transmit is executed further in response to the UE satisfying the congestion control limitation.

In a seventy-fourth aspect, alone or in combination with one or more of the seventieth aspect through the seventy-third aspect, wherein the congestion control limitation associated with the transmission resource pool and each sub-resource pool of the plurality of sub-resource pools is different.

In a seventy-fifth aspect, alone or in combination with one or more of the seventieth aspect through the seventy-fourth aspect, wherein the congestion control limitation includes one of: a relationship between a CBR and a CR; or a virtual collision-based congestion control.

In a seventy-sixth aspect, alone or in combination with one or more of the seventieth aspect through the seventy-fifth aspect, further including program code executable by the computer for causing the computer: to calculate, by the UE, a congestion control metric associated with one or more of the plurality of sub-resource pools and the transmission resource pool; and to report, by the UE, the congestion control metric to a serving base station.

In a seventy-seventh aspect, alone or in combination with one or more of the seventieth aspect through the seventy-sixth aspect, wherein the program code executable by the computer for causing the computer to report is executed one of: periodically or in response to a report trigger event.

In a seventy-eighth aspect, alone or in combination with one or more of the seventieth aspect through the seventy-seventh aspect, wherein a CR limit for the program code executable by the computer for causing the computer to determine the congestion control limitation associated with the relationship between the CBR and the CR is one of: a function of the sub-resource pool or a function of both of the sub-resource pool and the transmission resource pool.

In a seventy-ninth aspect, alone or in combination with one or more of the seventieth aspect through the seventy-eighth aspect, further including program code executable by the computer for causing the computer: to generate, by the UE, an intermediate CBR for the program code executable by the computer for causing the computer to determine the congestion control limitation associated with the relationship between the CBR and the CR for each sensing instance of the UE, wherein the program code executable by the computer for causing the computer to generate is initiated by a trigger condition including one of: a resource selection trigger based on arrival of a new data packet, a re-evaluation sensing period after selection of a preliminary transmission resource, or a CBR estimation signal received by the UE one of periodically or event-driven.

In an eightieth aspect, alone or in combination with one or more of the seventieth aspect through the seventy-ninth aspect, wherein the intermediate CBR includes a total number of available sub-channels of each sensing instance and a total number of occupied sub-channels of the total number of available sub-channels sensed during each sensing instance.

In an eighty-first aspect, alone or in combination with one or more of the seventieth aspect through the eightieth aspect, further including program code executable by the computer for causing the computer: to receive, by the UE, a configuration message configuring the UE to calculate the intermediate CBR using the total number of occupied sub-channels detected using one of a SCI or a RSRP.

In an eighty-second aspect, alone or in combination with one or more of the seventieth aspect through the eighty-first aspect, further including program code executable by the computer for causing the computer: to generate, by the UE, an intermediate congestion metric for the configuration of the at least one processor to determine the congestion control limitation associated with the relationship between the CBR and the CR for each sensing instance of the UE, wherein the program code executable by the computer for causing the computer to generate includes program code executable by the computer for causing the computer: to calculate a pool-specific congestion metric over a calculation window for each of the plurality of sub-resource pools and the transmission resource pool, wherein the calculation window for each of the plurality of sub-resource pools is different from the calculation window for the transmission resource pool, and wherein the calculation window for each of the plurality of sub-resource pools is different; and to accumulate the pool-specific congestion metric from the configuration of the at least one processor to calculate into the intermediate congestion metric, wherein the intermediate congestion metric includes one of a CBR or a CR.

In an eighty-third aspect, alone or in combination with one or more of the seventieth aspect through the eighty-second aspect, further including program code executable by the computer for causing the computer: to generate, by the UE, an intermediate CR for the program code executable by the computer for causing the computer to determine the congestion control limitation associated with the relationship between the CBR and the CR for each sensing instance of the UE, wherein the program code executable by the computer for causing the computer to generate is initiated by a trigger condition including one of: a resource selection trigger based on arrival of a new data packet, a re-evaluation sensing period after selection of a preliminary transmission resource, or a CR estimation signal received by the UE one of periodically or event-driven.

In an eighty-fourth aspect, alone or in combination with one or more of the seventieth aspect through the eighty-third aspect, wherein the intermediate CR includes a total number of available sub-channels of each sensing instance, and wherein a total CR for the program code executable by the computer for causing the computer to determine the congestion control limitation associated with the relationship between the CBR and the CR is determined by accumulation of each of the intermediate CR generated for each sensing instance of the UE.

In an eighty-fifth aspect, alone or in combination with one or more of the seventieth aspect through the eighty-fourth aspect, wherein the program code executable by the computer for causing the computer to select the sub-resource pool includes program code executable by the computer for causing the computer: to identify an admission control limitation associated with the sub-resource pool, wherein the admission control limitation includes one of: a high priority data limitation; a packet delay budget threshold; or a battery power threshold; and to determine whether a condition of the UE satisfies the admission control limitation, wherein a successful condition includes one of: the information for the sidelink transmission includes high priority data that meets the high priority data limitation; a currently packet delay budget for the information below the packet delay budget threshold; or a current battery power level at the UE below the battery power threshold, wherein the program code executable by the computer for causing the computer to transmit the information on the transmission resource of the sub-resource pool is in response to the successful condition.

In an eighty-sixth aspect, alone or in combination with one or more of the seventieth aspect through the eighty-fifth aspect, further including program code executable by the computer for causing the computer: to select a next sub-resource pool of the plurality of sub-resource pools associated with a next desired channel access type in response to a failure to determine the successful condition; to identify the admission control limitation associated with the next desired channel access type; and to determine whether the condition of the UE satisfies the admission control limitation of the next sub-resource pool.

In an eighty-seventh aspect, alone or in combination with one or more of the seventieth aspect through the eighty-sixth aspect, wherein the program code executable by the computer for causing the computer to select the sub-resource pool includes program code executable by the computer for causing the computer: to request, by a MAC layer of the UE to a PHY layer of the UE, to sense for available resources from the transmission resource pool according to a sensing set-up for the transmission resource pool, and report the available resources with sub-resource pool indices corresponding to an available sub-resource pool of the plurality of sub-resource pools in which the available resources are located; and to perform sub-resource pool-aware selection of the transmission resource using the sub-resource pool indices.

In an eighty-eighth aspect, alone or in combination with one or more of the seventieth aspect through the eighty-seventh aspect, wherein the program code executable by the computer for causing the computer to select the sub-resource pool includes program code executable by the computer for causing the computer: to request, by a MAC layer of the UE to a PHY layer of the UE, to: sense for available resources from the plurality of sub-resource pools and the transmission resource pool according to a sub-resource pool-specific sensing set-up for the plurality of sub-resource pools and according to a sensing set-up for the transmission resource pool, and report the available resources with sub-resource pool indices corresponding to an available sub-resource pool of the plurality of sub-resource pools in which the available resources are located; and to perform sub-resource pool-aware selection of the transmission resource using the sub-resource pool indices.

In an eighty-ninth aspect, alone or in combination with one or more of the seventieth aspect through the eighty-eighth aspect, wherein the program code executable by the computer for causing the computer to request to sense for the available resources includes program code executable by the computer for causing the computer: to determine the UE fails to meet one or more admission control criteria associated with one or more sub-resource pools of the plurality of sub-resource pools; and to request to sense for the available resources from the plurality of sub-resource pools excluding the one or more sub-resource pools and the transmission resource pool according to a sub-resource pool-specific sensing set-up for the plurality of sub-resource pools and according to a sensing set-up for the transmission resource pool.

In a ninetieth aspect, alone or in combination with one or more of the seventieth aspect through the eighty-ninth aspect, wherein the transmission resource is selected according to a resource selection procedure associated with the sub-resource pool, wherein the resource selection procedure associated with each sub-resource pool of the plurality of sub-resource pools is different and wherein the resource selection procedure with each sub-resource pool of the plurality of sub-resource pools is one of different or same as the resource selection procedure associated with the transmission resource pool.

In a ninety-first aspect, alone or in combination with one or more of the seventieth aspect through the ninetieth aspect, wherein the resource selection procedure includes one of: a random selection procedure; a predetermined selection sequence procedure; or an effective contention window selection procedure.

In a ninety-second aspect, alone or in combination with one or more of the seventieth aspect through the ninety-first aspect, further including program code executable by the computer for causing the computer: to select, by the UE, an initial transmission resource at a resource selection trigger, wherein the initial transmission resource is selected from an initial sub-resource pool of the plurality of sub-resource pools; to initiate, by the UE, re-evaluation sensing of the plurality of available resources in response to execution of the program code executable by the computer for causing the computer to select; to signal, by a PHY layer of the UE to the MAC layer of the UE, a sub-resource pool update message in response to the initiating, wherein the sub-resource pool update message indicates whether the initial transmission resource one of remains within the initial sub-resource pool or is located within a new sub-resource pool of the plurality of sub-resource pools.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   receiving, by the UE, a sidelink configuration message from a serving base station, wherein the sidelink configuration message includes identification of a plurality of channel access types associated with a plurality of sub-resource pools for autonomous sidelink access of a shared communication channel;
   obtaining, by the UE, information for a sidelink transmission over a transmission resource pool allocated for the autonomous sidelink access;
   determining, by the UE, the plurality of sub-resource pools from a plurality of available resources within the transmission resource pool according to a channel access type of each resource of the plurality of available resources, wherein each sub-resource pool of the plurality of sub-resource pools includes a subset of resources of the plurality of available resources associated with a corresponding channel access type;
   selecting, by the UE, a sub-resource pool of the plurality of sub-resource pools for sidelink transmission; and
   transmitting, by the UE, the information on a transmission resource selected from the sub-resource pool via the sideline transmission in response to successful access of the transmission resource according to the channel access type associated with the sub-resource pool.

2. The method of claim 1, further including:
   detecting, by the UE, configuration of a channel occupancy time (COT)-sharing occasion overlapping the transmission resource pool; and
   determining, by the UE, the channel access type according to a location of each resource of the transmission resource pool relative to the COT-sharing occasion.

3. The method of claim 2, wherein the determining the channel access type includes:

determining at least one COT-sharing channel access type for each resource of the transmission resource pool located within the overlapping COT-sharing occasion, wherein at least one sub-resource pool of the plurality of sub-resource pools is defined according to the at least one COT-sharing channel access type; and determining a pool channel access type for each resource of the transmission resource pool located outside of the overlapping COT-sharing occasion, wherein one sub-resource pool of the plurality of sub-resource pools is defined according to the pool channel access type.

4. The method of claim 1, wherein the selecting the sub-resource pool includes:

determining a congestion control limitation associated with one of: the transmission resource pool or the transmission resource pool and the sub-resource pool, wherein the transmitting is further in response to the UE satisfying the congestion control limitation.

5. The method of claim 4, wherein the congestion control limitation associated with the transmission resource pool and each sub-resource pool of the plurality of sub-resource pools is different.

6. The method of claim 4, wherein the congestion control limitation includes one of:

a relationship between a channel busy ratio (CBR) and a channel occupancy ratio (CR); or a virtual collision-based congestion control.

7. The method of claim 6, further including:

calculating, by the UE, a congestion control metric associated with one or more of the plurality of sub-resource pools and the transmission resource pool; and reporting, by the UE, the congestion control metric to a serving base station.

8. The method of claim 7, wherein the reporting is one of: periodically or in response to a report trigger event.

9. The method of claim 6, wherein a CR limit for the determining the congestion control limitation associated with the relationship between the CBR and the CR is one of: a function of the sub-resource pool or a function of both of the sub-resource pool and the transmission resource pool.

10. The method of claim 6, further including:

generating, by the UE, an intermediate CBR for the determining the congestion control limitation associated with the relationship between the CBR and the CR for each sensing instance of the UE, wherein the generating is initiated by a trigger condition including one of: a resource selection trigger based on arrival of a new data packet, a re-evaluation sensing period after selection of a preliminary transmission resource, or a CBR estimation signal received by the UE one of periodically or event-driven.

11. The method of claim 10, wherein the intermediate CBR includes a total number of available sub-channels of each sensing instance and a total number of occupied sub-channels of the total number of available sub-channels sensed during each sensing instance.

12. The method of claim 10, further including:

receiving, by the UE, a configuration message configuring the UE to calculate the intermediate CBR using the total number of occupied sub-channels detected using one of a sideline control information (SCI) or a reference signal receive power (RSRP).

13. The method of claim 6, further including:

generating, by the UE, an intermediate congestion metric for the determining the congestion control limitation associated with the relationship between the CBR and the CR for each sensing instance of the UE, wherein the generating includes:

calculating a pool-specific congestion metric over a calculation window for each of the plurality of sub-resource pools and the transmission resource pool, wherein the calculation window for each of the plurality of sub-resource pools is different from the calculation window for the transmission resource pool, and wherein the calculation window for each of the plurality of sub-resource pools is different; and accumulating the pool-specific congestion metric from the calculating into the intermediate congestion metric, wherein the intermediate congestion metric includes one of a CBR or a CR.

14. The method of claim 6, further including:

generating, by the UE, an intermediate CR for the determining the congestion control limitation associated with the relationship between the CBR and the CR for each sensing instance of the UE, wherein the generating is initiated by a trigger condition including one of: a resource selection trigger based on arrival of a new data packet, a re-evaluation sensing period after selection of a preliminary transmission resource, or a CR estimation signal received by the UE one of periodically or event-driven.

15. The method of claim 14, wherein the intermediate CR includes a total number of available sub-channels of each sensing instance, and wherein a total CR for the determining the congestion control limitation associated with the relationship between the CBR and the CR is determined by accumulation of each of the intermediate CR generated for each sensing instance of the UE.

16. The method of claim 1, wherein the selecting the sub-resource pool includes:

identifying an admission control limitation associated with the sub-resource pool, wherein the admission control limitation includes one of:

a high priority data limitation;

a packet delay budget threshold; or a battery power threshold; and determining whether a condition of the UE satisfies the admission control limitation, wherein a successful condition includes one of:

the information for the sidelink transmission includes high priority data that meets the high priority data limitation;

a currently packet delay budget for the information below the packet delay budget threshold; or a current battery power level at the UE below the battery power threshold, wherein the transmitting the information on the transmission resource of the sub-resource pool is in response to the successful condition.

17. The method of claim 16, further including:

selecting a next sub-resource pool of the plurality of sub-resource pools associated with a next desired channel access type in response to a failure to determine the successful condition;

identifying the admission control limitation associated with the next desired channel access type; and determining whether the condition of the UE satisfies the admission control limitation of the next sub-resource pool.

18. The method of claim 1, wherein the selecting the sub-resource pool includes:

requesting, by a medium access control (MAC) layer of the UE to a physical (PHY) layer of the UE, to
sense for available resources from the transmission resource pool according to a sensing set-up for the transmission resource pool, and
report the available resources with sub-resource pool indices corresponding to an available sub-resource pool of the plurality of sub-resource pools in which the available resources are located; and
performing sub-resource pool-aware selection of the transmission resource using the sub-resource pool indices.

19. The method of claim 1, wherein the selecting the sub-resource pool includes:
requesting, by a medium access control (MAC) layer of the UE to a physical (PHY) layer of the UE, to:
sense for available resources from the plurality of sub-resource pools and the transmission resource pool according to a sub-resource pool-specific sensing set-up for the plurality of sub-resource pools and according to a sensing set-up for the transmission resource pool, and
report the available resources with sub-resource pool indices corresponding to an available sub-resource pool of the plurality of sub-resource pools in which the available resources are located; and
performing sub-resource pool-aware selection of the transmission resource using the sub-resource pool indices.

20. The method of claim 19, wherein the requesting to sense for the available resources includes:
determining the UE fails to meet one or more admission control criteria associated with one or more sub-resource pools of the plurality of sub-resource pools; and
requesting to sense for the available resources from the plurality of sub-resource pools excluding the one or more sub-resource pools and the transmission resource pool according to a sub-resource pool-specific sensing set-up for the plurality of sub-resource pools and according to a sensing set-up for the transmission resource pool.

21. The method of claim 1, wherein the transmission resource is selected according to a resource selection procedure associated with the sub-resource pool, wherein the resource selection procedure associated with each sub-resource pool of the plurality of sub-resource pools is different and wherein the resource selection procedure with each sub-resource pool of the plurality of sub-resource pools is one of different or same as the resource selection procedure associated with the transmission resource pool.

22. The method of claim 21, wherein the resource selection procedure includes one of:
a random selection procedure;
a predetermined selection sequence procedure; or
an effective contention window selection procedure.

23. The method of claim 1, further including:
selecting, by the UE, an initial transmission resource at a resource selection trigger, wherein the initial transmission resource is selected from an initial sub-resource pool of the plurality of sub-resource pools;
initiating, by the UE, re-evaluation sensing of the plurality of available resources in response to the selecting; and
signaling, by a physical (PHY) layer of the UE to the medium access control (MAC) layer of the UE, a sub-resource pool update message in response to the initiating, wherein the sub-resource pool update message indicates whether the initial transmission resource one of remains within the initial sub-resource pool or is located within a new sub-resource pool of the plurality of sub-resource pools.

24. A user equipment (UE) configured for wireless communication, the apparatus comprising:
at least one processor; and
a memory coupled to the at least one processor,
wherein the at least one processor is configured:
to receiving, by the UE, a sidelink configuration message from a serving base station, wherein the sidelink configuration message includes identification of a plurality of channel access types associated with a plurality of sub-resource pools for autonomous sidelink access of a shared communication channel;
to obtain, by the UE, information for a sidelink transmission over a transmission resource pool allocated for the autonomous sidelink access;
to determine, by the UE, the plurality of sub-resource pools from a plurality of available resources within the transmission resource pool according to a channel access type of each resource of the plurality of available resources, wherein each sub-resource pool of the plurality of sub-resource pools includes a subset of resources of the plurality of available resources associated with a corresponding channel access type;
to select, by the UE, a sub-resource pool of the plurality of sub-resource pools for sidelink transmission; and
to transmit, by the UE, the information on a transmission resource selected from the sub-resource pool via the sideline transmission in response to successful access of the transmission resource according to the channel access type associated with the sub-resource pool.

25. The UE of claim 24, further including configuration of the at least one processor:
to detect, by the UE, configuration of a channel occupancy time (COT)-sharing occasion overlapping the transmission resource pool; and
to determine, by the UE, the channel access type according to a location of each resource of the transmission resource pool relative to the COT-sharing occasion.

26. The UE of claim 24, wherein the configuration of the at least one processor to select the sub-resource pool includes configuration of the at least one processor:
to determine a congestion control limitation associated with one of: the transmission resource pool or the transmission resource pool and the sub-resource pool, wherein the configuration of the at least one processor to transmit is further in response to the UE satisfying the congestion control limitation.

27. The UE of claim 26, wherein the congestion control limitation includes one of:
a relationship between a channel busy ratio (CBR) and a channel occupancy ratio (CR); or
a virtual collision-based congestion control.

28. The UE of claim 24, wherein the configuration of the at least one processor select the sub-resource pool includes configuration of the at least one processor:
to identify an admission control limitation associated with the sub-resource pool, wherein the admission control limitation includes one of:
a high priority data limitation;
a packet delay budget threshold; or
a battery power threshold; and to determine whether a condition of the UE satisfies the admission control limitation, wherein a successful condition includes one of:
  the information for the sidelink transmission includes high priority data that meets the high priority data limitation;
  a currently packet delay budget for the information below the packet delay budget threshold; or
  a current battery power level at the UE below the battery power threshold,
wherein the configuration of the at least one processor to transmit the information on the transmission resource of the sub-resource pool is in response to the successful condition.

29. The UE of claim 28, further including configuration of the at least one processor:
  to select a next sub-resource pool of the plurality of sub-resource pools associated with a next desired channel access type in response to a failure to determine the successful condition;
  to identify the admission control limitation associated with the next desired channel access type; and
  to determine whether the condition of the UE satisfies the admission control limitation of the next sub-resource pool.

30. The UE of claim 24, further including configuration of the at least one processor:
  to select, by the UE, an initial transmission resource at a resource selection trigger, wherein the initial transmission resource is selected from an initial sub-resource pool of the plurality of sub-resource pools;
  to initiate, by the UE, re-evaluation sensing of the plurality of available resources in response to the configuration of the at least one processor to select; and
  to signal, by a physical (PHY) layer of the UE to the medium access control (MAC) layer of the UE, a sub-resource pool update message in response to the initiating, wherein the sub-resource pool update message indicates whether the initial transmission resource one of remains within the initial sub-resource pool or is located within a new sub-resource pool of the plurality of sub-resource pools.

* * * * *